(12) United States Patent
Wegner et al.

(10) Patent No.: US 7,276,661 B2
(45) Date of Patent: *Oct. 2, 2007

(54) ELECTRICAL BOX EXTENSION

(76) Inventors: Wesley Gene Wegner, 3486 Robin Hill, Thousand Oaks, CA (US) 91360; Paul Brett Wegner, 13418 Beach St., Los Angeles, CA (US) 90292

( * ) Notice: Subject to any disclaimer, the term of this patent is extended or adjusted under 35 U.S.C. 154(b) by 429 days.

This patent is subject to a terminal disclaimer.

(21) Appl. No.: 10/971,920

(22) Filed: Oct. 21, 2004

(65) Prior Publication Data

US 2005/0051354 A1 Mar. 10, 2005

Related U.S. Application Data

(63) Continuation-in-part of application No. 10/349,746, filed on Jan. 21, 2003, now Pat. No. 6,820,760, which is a continuation-in-part of application No. 10/144,210, filed on May 13, 2002, now abandoned.

(60) Provisional application No. 60/370,419, filed on Apr. 4, 2002.

(51) Int. Cl.
*H02G 3/08* (2006.01)

(52) U.S. Cl. .............................. 174/58; 174/57; 220/3.2; 220/3.3; 220/3.9

(58) Field of Classification Search .................. 220/3.7, 220/3.2–3.3, 3.9; 174/58, 57
See application file for complete search history.

(56) References Cited

U.S. PATENT DOCUMENTS

| 740,663 | A | | 10/1903 | Krantz |
|---|---|---|---|---|
| 2,989,206 | A | | 6/1961 | McAfee |
| 3,006,216 | A | | 10/1961 | Sisson et al. |
| 3,189,077 | A | | 6/1965 | Willis, Jr. et al. |
| 3,319,919 | A | | 5/1967 | Eisenberg |
| 3,433,886 | A | | 3/1969 | Myers |
| 4,603,789 | A | | 8/1986 | Medlin, Sr. |
| 4,634,015 | A | * | 1/1987 | Taylor .......................... 220/3.7 |
| 4,685,037 | A | | 8/1987 | Akiyama et al. |
| 5,012,043 | A | * | 4/1991 | Seymour ....................... 174/57 |
| 5,042,673 | A | | 8/1991 | McShane |
| 5,117,996 | A | | 6/1992 | McShane |
| 5,293,003 | A | | 3/1994 | Prairie |
| 5,596,174 | A | | 1/1997 | Sapienza |
| 5,680,947 | A | | 10/1997 | Jorgensen |
| 5,736,674 | A | | 4/1998 | Gretz |
| 5,931,325 | A | * | 8/1999 | Filipov ......................... 220/3.7 |
| 5,959,246 | A | | 9/1999 | Gretz |
| 5,967,354 | A | | 10/1999 | Whitehead et al. |
| 5,975,323 | A | * | 11/1999 | Turan ........................... 220/3.7 |
| 6,180,879 | B1 | | 1/2001 | Gretz |
| 6,204,447 | B1 | | 3/2001 | Gretz |
| 6,307,154 | B1 | * | 10/2001 | Gretz ............................ 174/50 |

(Continued)

*Primary Examiner*—Anthony Stashick
*Assistant Examiner*—Christopher McKinley
(74) *Attorney, Agent, or Firm*—Michael Blaine Brooks, P.C.; Michael B. Brooks

(57) ABSTRACT

Disclosed is an electrical box mud ring member adapted to either receive an electrical device or receive an extending member adapted to both receive an electrical device and be elevated relative to the mud ring via one or more elevating fasteners. Either the mud ring member or the extending member, or both, have protrusions that maintain mechanical and electrical contact between the two members. The electrical box mud ring member preferably has frangible electrical device mounting plates.

17 Claims, 21 Drawing Sheets

U.S. PATENT DOCUMENTS 6,457,914 B1  10/2002  Andras et al.
6,576,837 B1 *  6/2003  Pimentel .................... 174/58
7,053,300 B2  5/2006  Denier et al.

* cited by examiner

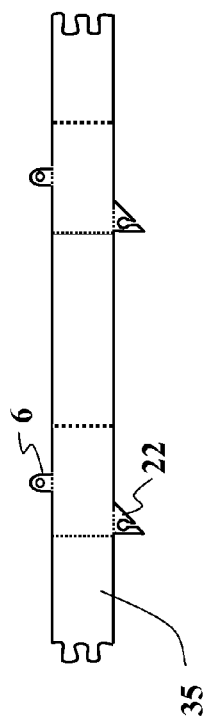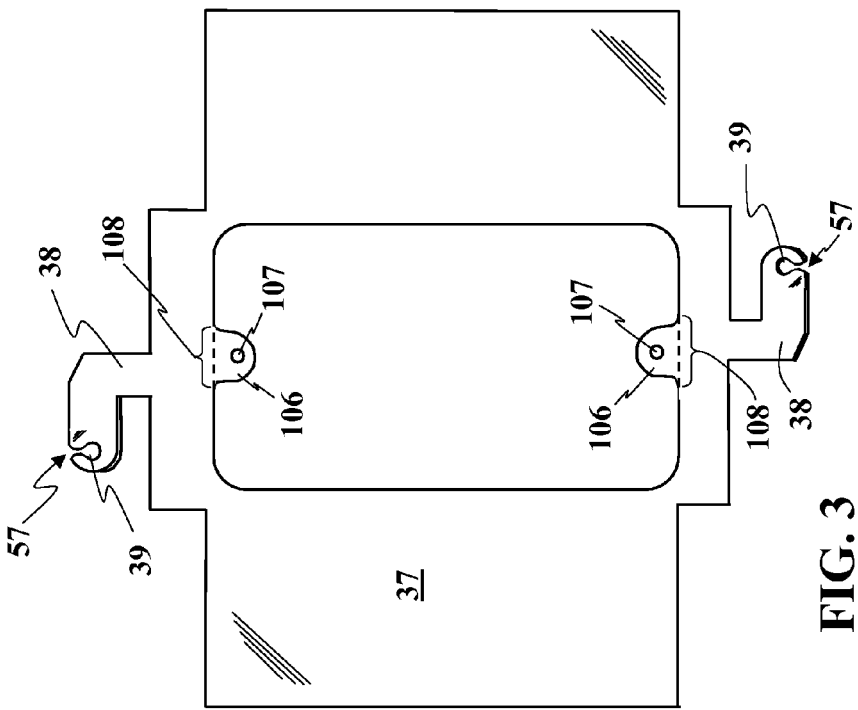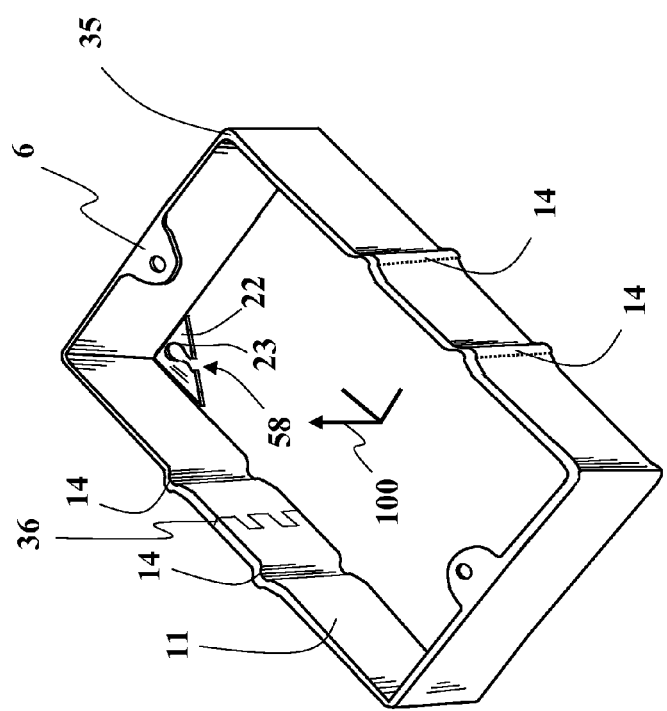

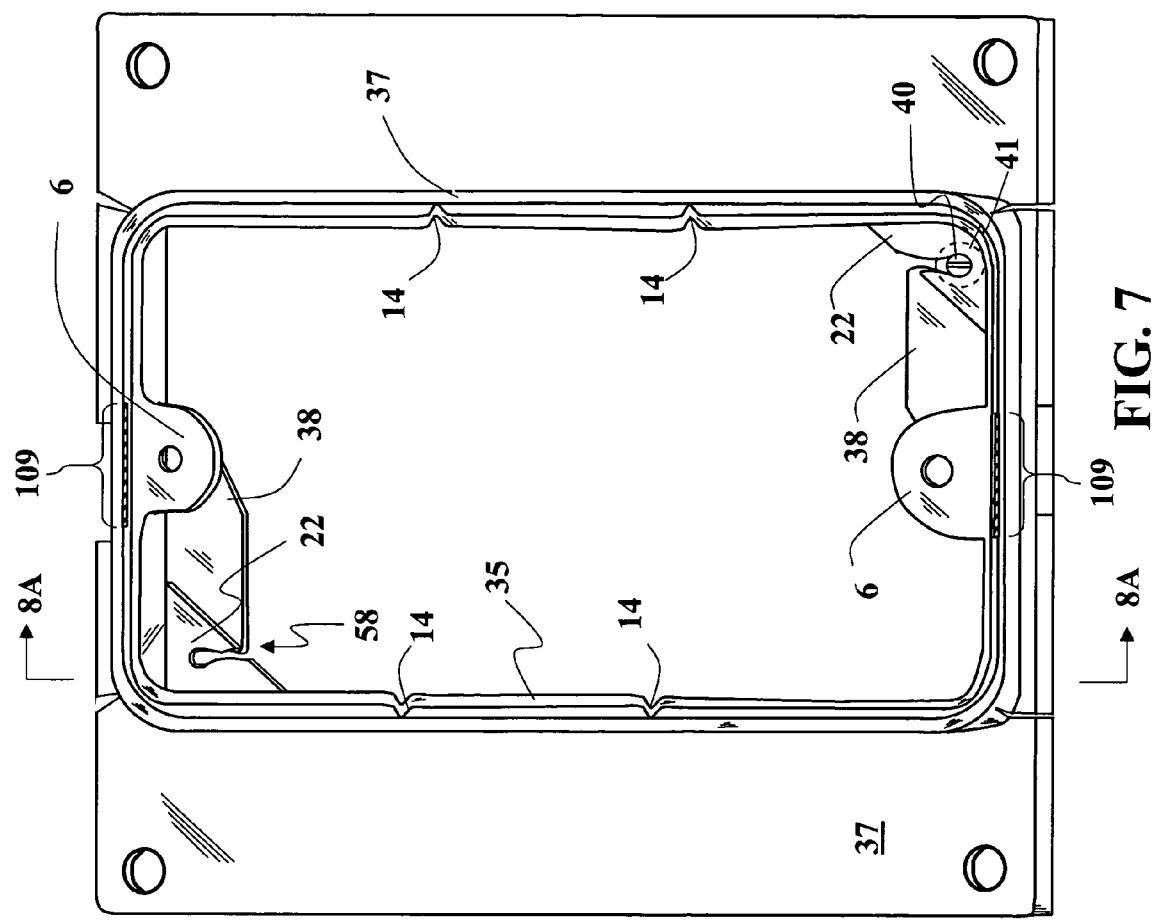

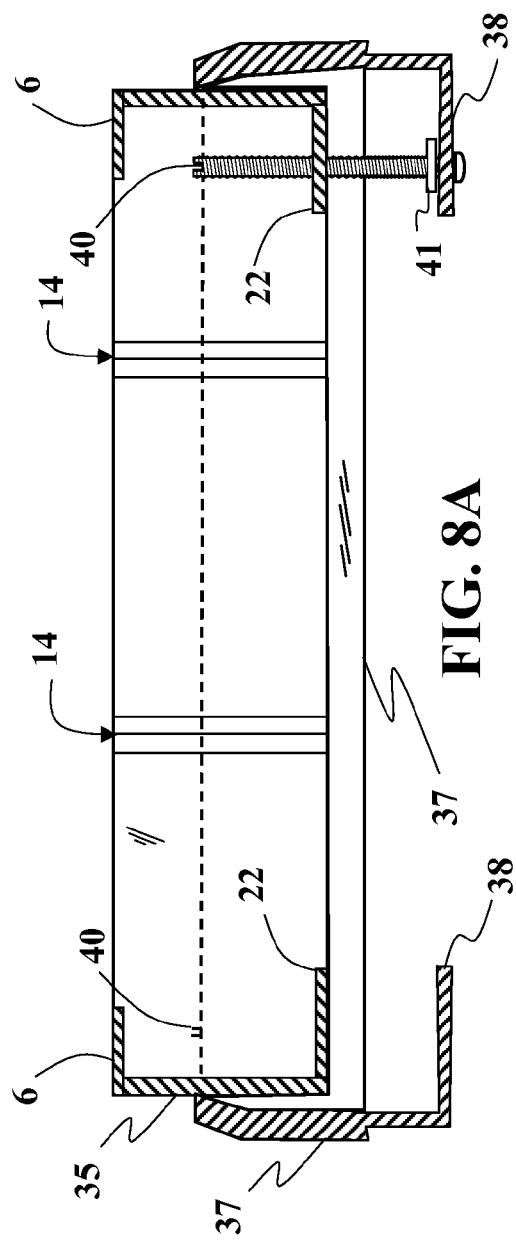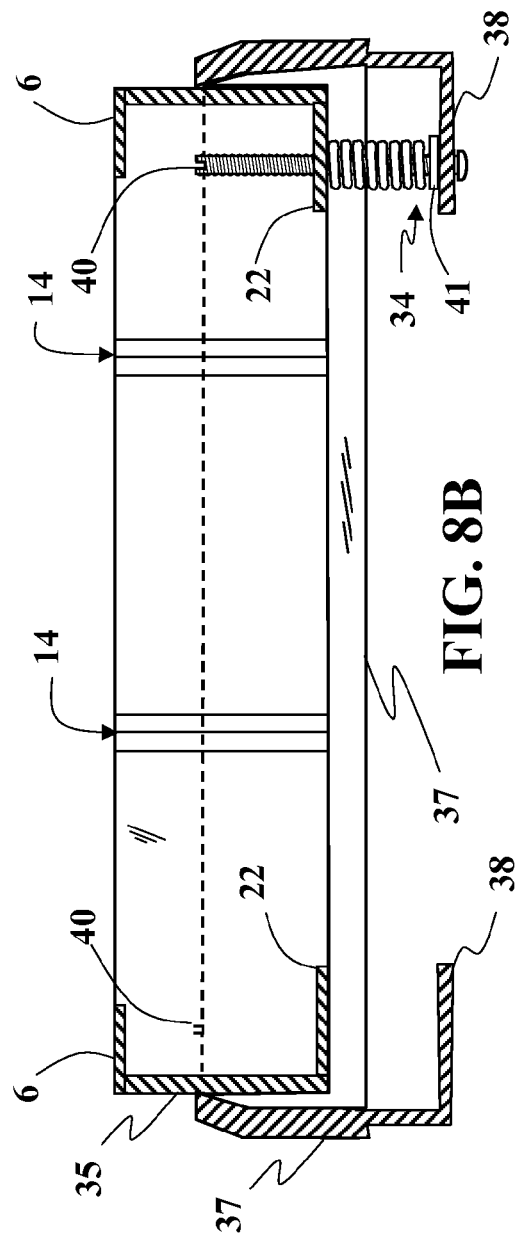

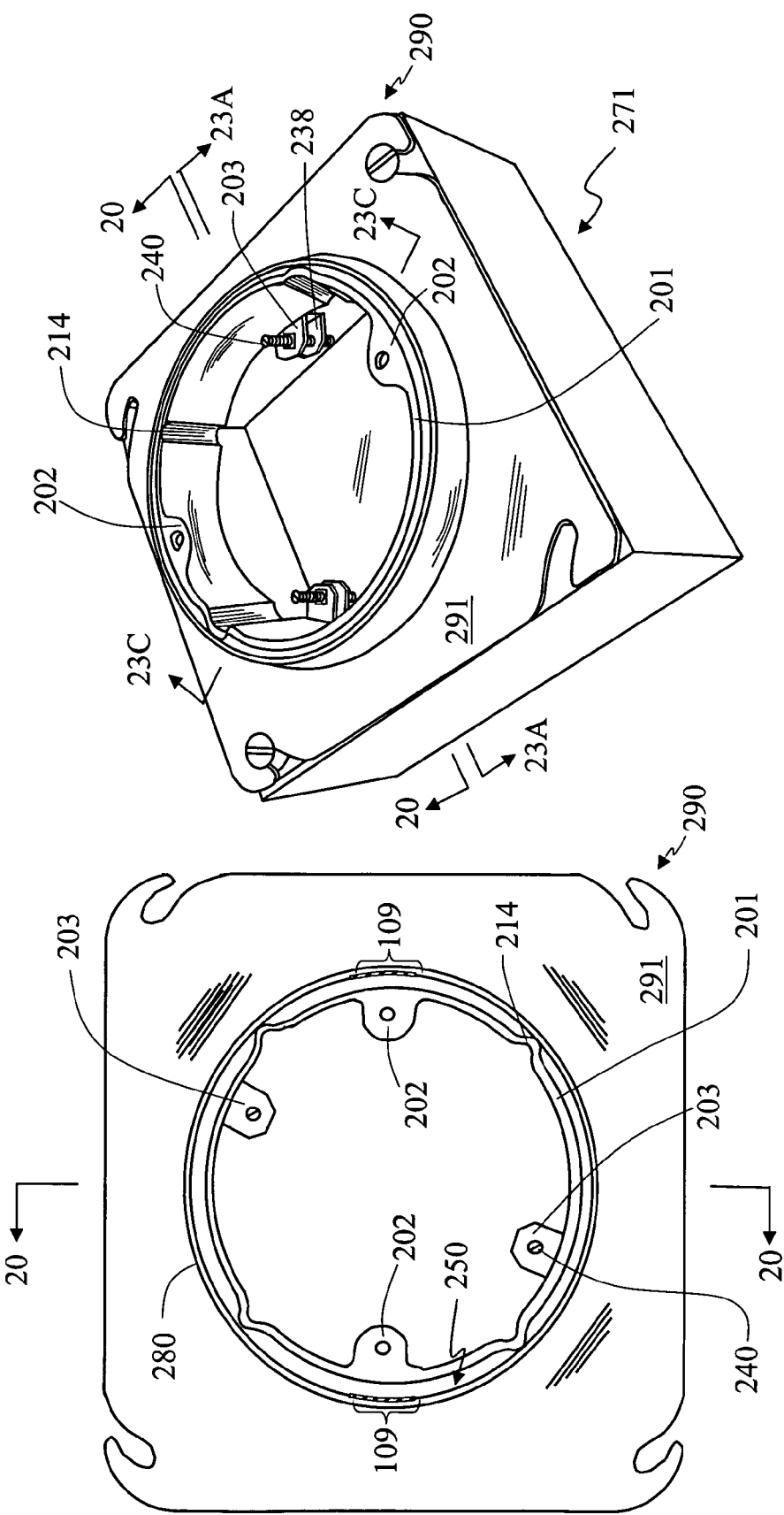

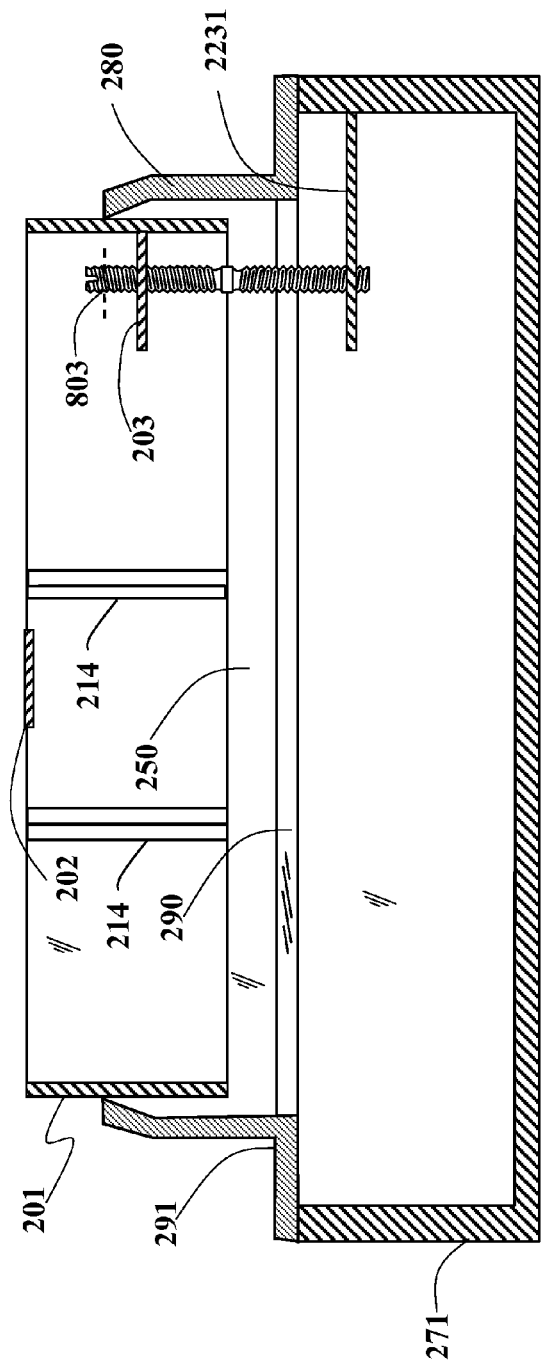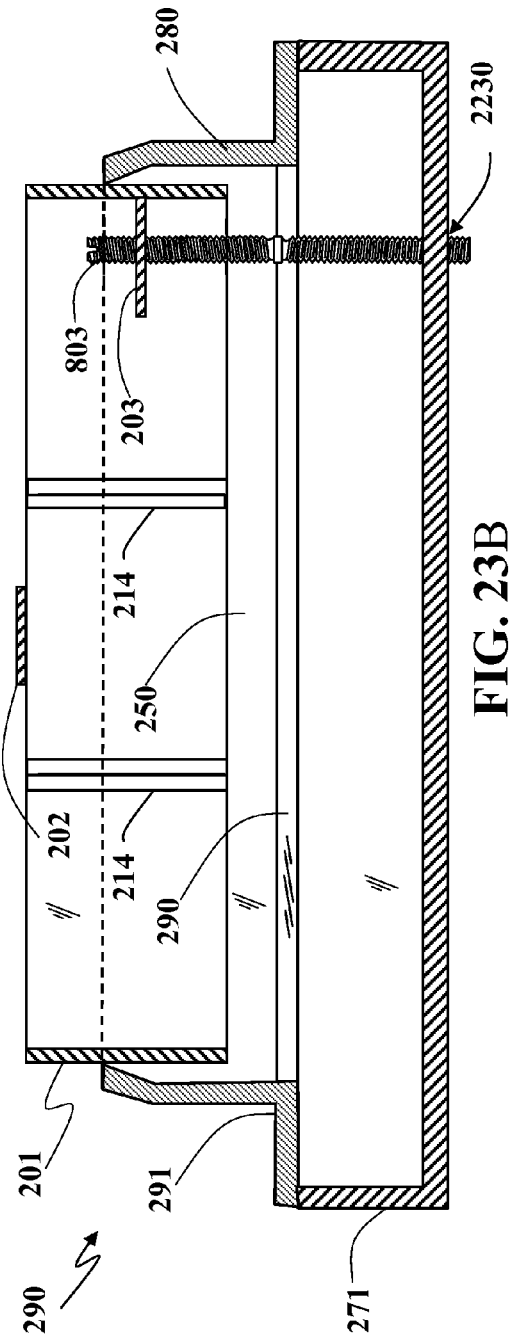
FIG. 23A
FIG. 23B

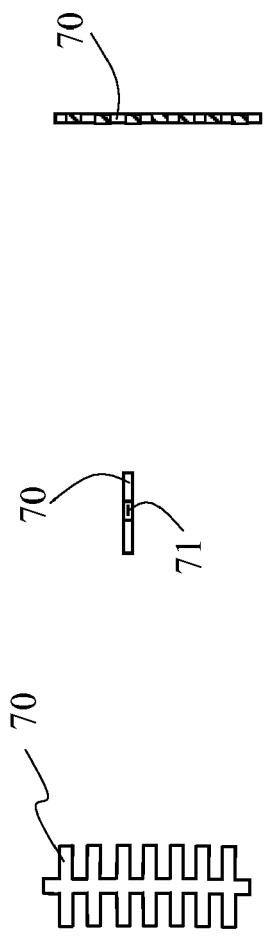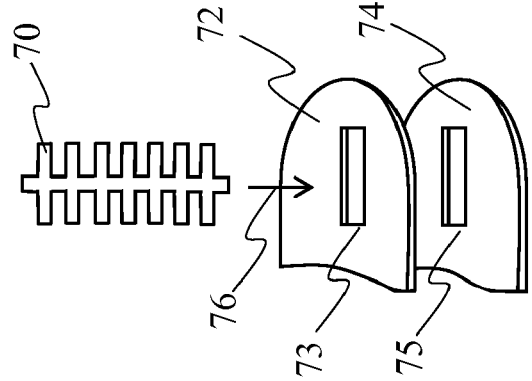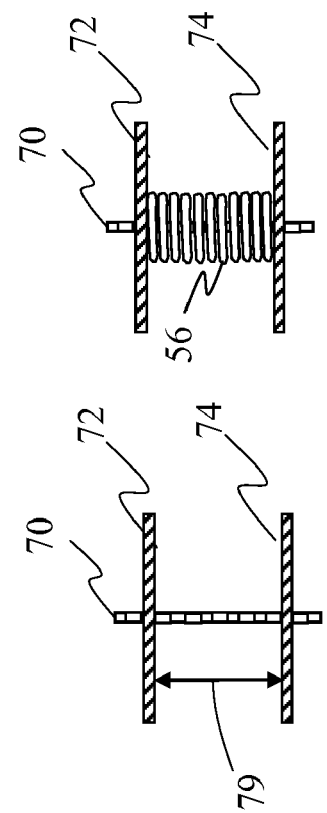

ELECTRICAL BOX EXTENSION

CROSS REFERENCE TO RELATED APPLICATIONS

This application is a continuation-in-part of application Ser. No. 10/349,746 filed Jan. 21, 2003 U.S. Pat. No. 6,820,760 issued Nov. 23, 2004, which is a continuation-in-part of application Ser. No. 10/144,210 filed May 13, 2002 now abandoned, and claims the benefit of provisional application No. 60/370,419, to Wesley Gene Wegner and Paul Brett Wegner entitled "ELECTRICAL BOX EXTENSION," filed Apr. 4, 2002, and all three applications are hereby incorporated by reference herein, in their entirety, for all purposes.

BACKGROUND

This invention generally relates to electrical equipment for housing electrical devices such as switches and outlets, and particularly to electrical box extensions.

Electrical boxes are commonly used to provide electrical service at convenient locations within buildings. The electrical boxes are commonly formed of plastic or metal and are usually securely fastened by screws or nails to the framework of a structure being prepared for electrification. In newly constructed buildings, the open face of the electrical box, within which an electrical device such as an outlet or switch will be mounted, is usually flush with the surface of the wall or ceiling in which it is installed.

When buildings are renovated or restored or otherwise modified from their original wall and ceiling surfaces, it is common for renovators to lay down new sheet stock such as sheet rock, paneling, and the like, over the existing ceilings or walls. This process of layering causes the existing electrical boxes to become recessed within the built-up wall by the thickness of the new sheet stock. A need for extension therefore occurs when the box or mud ring has been placed and then tile, brick or some other wall covering is added thereby causing the screw mounts for plugs and/or switches to be recessed within the wall.

To solve this problem, box extenders of several different types have been developed. One type relies on a friction fit to hold the box extender in the existing electrical box. This extender does not provide a secure attachment to the existing box and may allow an attached electrical device to slide further within the box as the extender will slide based on an external force.

Another type of extender consists of an extension having walls of approximately the same configuration as the existing box and of fixed depths of extension. The extender is available in several depths to accommodate several different sheet stock thicknesses. Although there are several depths available, the depth is not continuously variable resulting in an inability to consistently provide a depth extension bringing the existing box flush with the outer wall surface.

Another type of extender includes a body portion having at least one wall and open faces. The extender includes side flanges having holes that align with brackets that are connected to the electrical box. This extender is difficult to use and install as brackets must be firmly attached to the electrical box and then two screws are used to attach each flange of the extender to the electrical box.

There remains a need to extend the electrical box with a minimal number of parts that provide ready height adjustment while maintaining mechanical and structural soundness and electrical connectivity including ground, and thereby compensate for add-ons to a wall that cause depth to be added between the box or ring and the outer wall.

SUMMARY

Disclosed is a mud ring or adapting member for an electrical box that is adapted to receive an extending member or slider and is adapted to receive one or more elevating fasteners whereby turns of the one or more elevating fasteners extend or retract the slider relative to the adapting member. The mud ring may have detachable brackets that may be used as a conventional means of attaching switches or outlets and may be detached to allow for the insertion and travel of the slider. Disclosed is an electrical box extension including an extending member with one or more fastening brackets, one or more fastening brackets and one or more elevating fasteners such as a double reverse screw or a standard threaded screw with attached grommet for mechanically electrically connecting the extending member and the box via the fasteners, brackets, and/or ridges and thereby providing sufficient mechanical resistance to support the adjustable elevation of the extending member and providing a flush surface for surface mounted sockets, switches and their associated plates. The extending member, the mud ring, or both, provide electrical connectivity via one or more protrusions or projections from the slider against the adapting member or via one or more protrusions or projections from the adapting member against the slider, or a combination of both means of mechanical and electrical connectivity.

The invention in its several embodiments includes a mud ring for electrical box extension having an adapting plate portion or member with a substantially centrally located aperture and bordering the aperture is a flange portion substantially perpendicular to the adapting plate member and extending in the direction of the outward side of the adapting plate portion and oriented substantially about a principal axis of extension of the mud ring. In addition, the mud ring further includes at least one adaptor fastener mounting plate preferably extending from an edge of the adapting plate member, each of the at least one adaptor fastener mounting plates having an end section with an aperture for receiving a fastener axially and laterally, wherein each end section of the at least one adaptor fastener mounting plate extending substantially in the direction of inward side of and preferably below the flange portion.

Accordingly, the mud ring is adapted to receive an extending member, wherein each of the at least one adaptor fastener mounting plate has an associated extender fastener mounting plate, where each extender fastener mounting plate has an aperture for receiving a fastener, each extender fastener mounting plate fixedly attaches to the extending member and each extender fastener mounting plate aperture is preferably substantially aligned with the associated adaptor fastener mounting plate aperture and wherein the extending member includes a polyhedron-shaped surface with substantially rectangular-shaped facets about a principal axis of extension and in alternative embodiments includes circular and oval shaped or otherwise tubular surfaces.

The extending member is preferably oriented about the principal axis extension of the mud ring with the outward surface of the extending member in close proximity to the inward side of the flange portion, wherein the outer surface of the extending member has at least one protrusion in mechanical and electrical contact with the inward side of the flange portion and at least one fastener for detachably attaching the adapting plate portion to the extending member by way of the aligned adapting member fastener mounting plate aperture and the aligned extending member fastener mounting plate.

Alternative embodiments include the inner side of the flange having at least one protrusion in mechanical and electrical contact with the outward side of the extending member. By these embodiments, the at least one protrusion maintains mechanical and electrical connectivity between the extending member and the adapting member while the adjusting of the at least one fastener modifies the height of the extending member relative to the adapting member in an adjustable and substantially reversible fashion. In addition, to increase the length of extension, the extending member fastener mounting plates are preferably extended from the edge of the extending member proximate to the electrical box when mounted and the adapting member fastener mounting plate may be extending into the well or cavity of the electrical box and afford an extending member height substantially equal to the combined height of the flange portion extending in the direction of the outward side of the adapting plate portion and the downward extension length of adapting member fastener mounting plate.

The adapting member screw mounting plate of some of these embodiments preferably has an aperture for receiving a threaded fastener, the extender screw mounting plates has a smooth aperture, where the at least one fastener is a screw having a grommet for example attached to a portion of the screw between the at least one extender screw mounting plate and the at least one adaptor screw mounting plate, whereby the turning of the screw maintains mechanical connectivity between the adapting plate portion and the extending member while modifying the height of the extending member relative to the adapting plate portion in an adjustable and substantially reversible fashion. In some embodiments where the elevating fastener is a single threaded screw, a spring may be placed about each screw, wherein each spring is in compression and depending on the screw orientation, the spring may be preferably between the adapting member screw mounting plate and the extending member screw mounting plate or between a grommet or washer fixed to the barrel of the screw and the extending member

BRIEF DESCRIPTION OF THE DRAWINGS

For a more complete understanding of the present invention and for further features and advantages, reference is now made to the following description taken in conjunction with the accompanying drawings, in which:

FIG. 1 is a planform view of an example extending member embodiment of the present invention;

FIG. 2 is an example extending member embodiment of the present invention;

FIG. 3 is a planform view of an example mud ring or adapting member embodiment of the present invention;

FIG. 7 is a top view of the exemplary assembly of the present invention;

FIG. 8A is a cross-sectional view of the exemplary assembly of the present invention;

FIG. 8B is a cross-sectional view of an alternative embodiment of the assembly of the present invention;

FIG. 18 is a top view of an assembly of an alternative embodiment of the present invention;

FIG. 19 is a perspective view of an extending member within an adapting member of an alternative embodiment of the present invention;

FIG. 23A is a cross-sectional view of an alternative embodiment of the present invention having a bracket attached to the electrical box;

FIG. 23B is a cross-sectional view of an alternative embodiment of the present invention engaging an electrical box;

FIG. 24A is a front view of an elevating fastener of an alternative embodiment of the present invention;

FIG. 24B is a top view of an elevating fastener of an alternative embodiment of the present invention;

FIG. 24C is a side view of an elevating fastener of an alternative embodiment of the present invention;

FIG. 24D is a perspective view of an elevating fastener proximate to receiving brackets of an alternative embodiment of the present invention;

FIG. 24E is a perspective view of an elevating fastener within the receiving brackets of an alternative embodiment of the present invention;

FIG. 24F is a perspective view of an elevating fastener engaged between receiving brackets of an alternative embodiment of the present invention;

FIG. 24G is a perspective view of an elevating fastener engaged between receiving brackets of an alternative embodiment of the present invention;

DETAILED DESCRIPTION OF THE INVENTION

Figure 4:
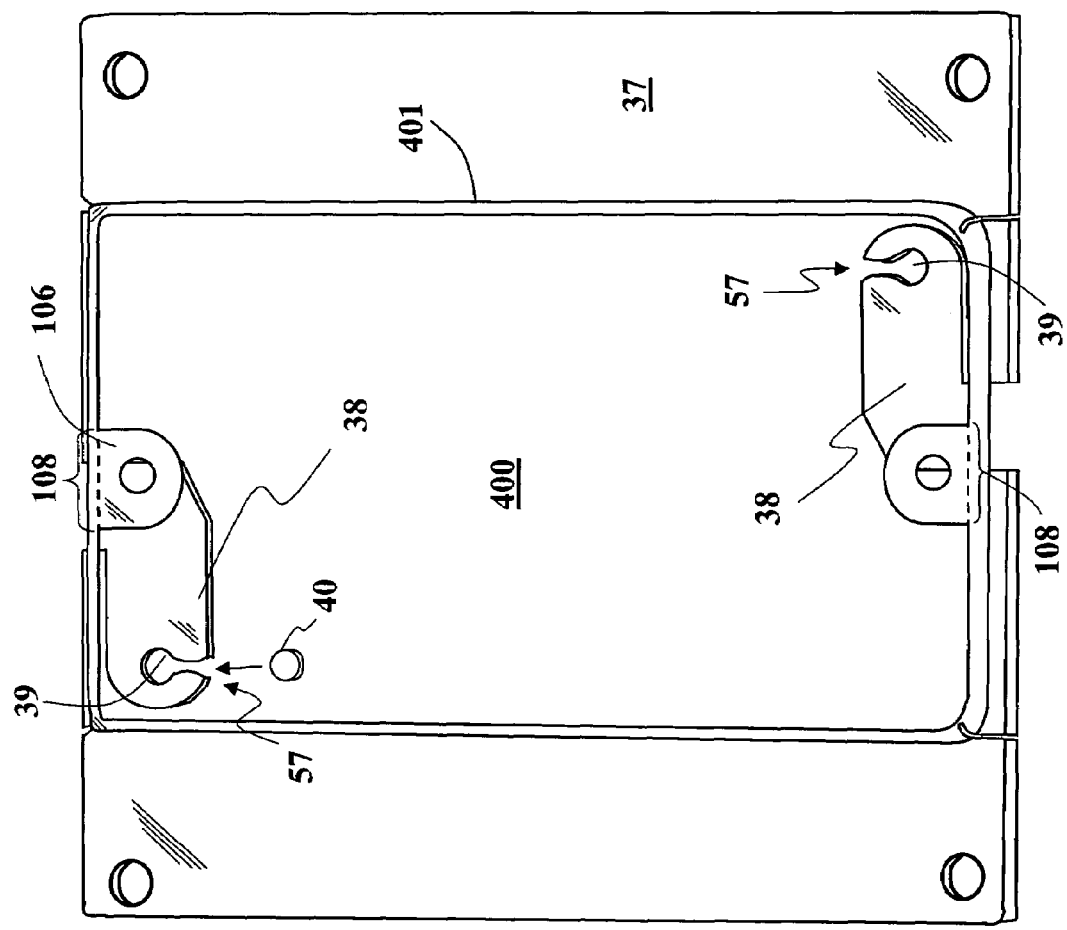
FIG. 4 is a top view of an exemplary adapting member embodiment of the present invention; screw mounting plate.

The extending member, or sliding tubular member, is an attachable or otherwise adjustable element of an assembly comprised of the extending member and a mud ring, adapting member or electrical box. A first embodiment has at least two sets of mounting brackets, placed in each of two diametrically opposed corners. One bracket is placed at the base of the ring and extends into the open portion of the ring. The second bracket is preferably placed at proximate to the base of the extending member to maximize screw/extending member travel. An alternative embodiment has the second bracket approximately midway between the base and top of the extending member. Each bracket has a tapped entry for a combination left-right thread screw. By turning either screw, the extension is elevated or lowered such that the outer edge of the extension is made substantially flush with the wall surface. The design of the brackets and screw mounting effects a solid ground and satisfies the electrical grounding requirements. Embodiments without the fasteners use protrusions from the extension and/or the ring to maintain the electrical grounding. Additional sets of mounting brackets may be required depending primarily upon the ring/box size. For example, a two-gang article preferably has mounting brackets on the middle portion of each of the opposite inner sides of the adapting member.

In several embodiments of the present invention, an adapting member or mud ring is adapted to receive a sliding member and is adapted to connect with the sliding member via one or more elevating fasteners. The mud ring preferably has frangible electrical device mounting tabs or brackets that may be used in a conventional manner, for example, when the mud ring is used with a five-sided electrical box, to detachably attach such electrical devices as electrical outlets or switches. After the removal of the tabs, an extending member, or slider, may be inserted into the aperture of the mud ring. The slider is preferably connected to the mud ring by one or more fasteners that are preferably laterally inserted into a slider mounting tab of the mud ring and a slider mounting tab of the extending member. If not inserted laterally, the elevating fasteners may be screwed into position. Once positioned, it is preferably by rotating the fastener, that the slider is extended or retracted relative to the mud ring. In those embodiments where electrical connectivity is not maintained by the elevating fasteners alone, electrical connectivity is maintained by protrusions that extend from the slider to contact the mud ring or from the mud ring to contact the slider, where these protrusion embodiments may be employed separately or in combination.

The extending member, sliding tubular member, or slider, is an attachable or otherwise adjustable element of an electrical box extension assembly that includes the extending member adapted to be elevated and retracted by one or more extending or elevating fasteners and a mud ring, adapting member or electrical box adapted to support the extension and retraction of the extending member via the one or more elevating fasteners. One embodiment has at least two sets of mounting brackets, placed in each of two diametrically opposed corners. One bracket is placed at the base of the ring and extends into the open portion of the ring. The second bracket is preferably placed proximate to the base of the extending member and preferably extending into the well of the electrical box to maximize screw/extending member travel.

FIG. 1 illustrates an example form of the slider 35, or extending member, prior to shaping and protrusion stamping taking place preferably having electrical device mounting plates 6 and slider brackets, or upper brackets 22 as tabs preferably extending in an inward direction, that is toward the space bounded by the extending member 35 and substantially in the respective planes formed by the top and bottom rims of the extending member 35. FIG. 2 illustrates the example slider or extending member 35, where the extending member 35 is shaped into a polyhedral or tubular member preferably about a principal axis extension 100 and connected along a seam 36, with electrical device mounting plates 6 and a plurality of protrusions 14 stamped into the sliding member wall. Preferably, the slider bracket, or upper bracket 22, is formed from a bent tab for example having an aperture 23 that receives an elevating fastener that is preferably a threaded fastener. The slider bracket, or upper bracket 22, connects the slider 35 with the mud ring or adapting member.

FIG. 3 illustrates a form of the preferred adapting member 37 with bracket portions 38 extended showing guiding apertures 39 with lateral fastener access 57. Once stamped, the bracket portions are extended and shaped to provide a surface with the guiding aperture 39 aligned with the slider aperture 23. A blank of an adapting member 37 such as the example of FIG. 3 may be stamped or otherwise drawn or cast into the preferred shape, particularly with respect to the flange portion with the mounting bracket 38 preferably bent into a shape adapted to extend downward from the mud ring 37 into the well of an electrical box, for example, and then extend perpendicularly from the downward extension toward the center of the aperture formed by the shaped flange of the mud ring 37. The adapting member 37 includes at least one plug/switch mounting plate 106 and preferably two frangible plug/switch mounting plates 106 in the example illustrated in FIG. 3. The mounting plate 106 has an aperture 107 that preferably receives a threaded fastener. The preferred embodiment has one or more frangible device mounting plates 106 where the devices include switch and outlet plugs. The frangibility of the frangible mounting plates 106 is preferably achieved via stamped perforations 108. The perforations 108 allow the mounting plate 106 to snap off preferably by the manual inducement of metal fatigue thereby clearing the mud ring aperture and enabling the sliding member 35 to travel within the adapting member 37. These perforations 108 are examples of a frangible region and may alternatively, for example, be one or more stamped creases or substantially linear regions where the thickness of the material accommodates separation by mechanical shearing.

Figure 5:
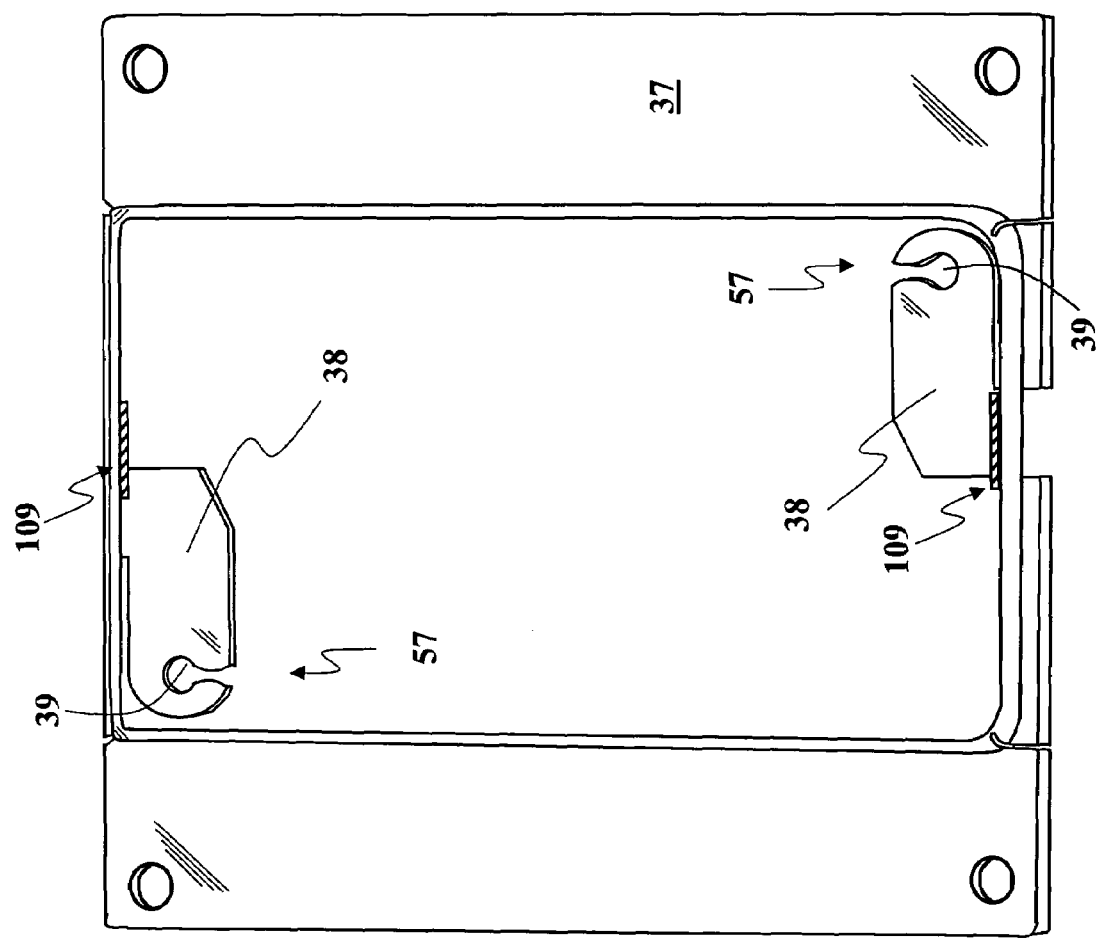
FIG. 5 is a top view of an exemplary adapting member embodiment of the present invention wherein the mounting tabs or brackets have been removed.

The example mud ring 37 embodiment of FIG. 4 satisfies the customary functions of a mud ring of being adapted to detachably attach to an electrical box and being adapted to receive, by mechanical detachable attachment, an electrical device such as an electrical outlet or an electrical switch for example. The example embodiment of FIG. 4 is additionally adapted to receive extending members that may be installed within the mud ring aperture 400 subsequent to the attachment of the mud ring 37 to an electrical box. FIG. 4 illustrates an example of the adapting member 37 having the flange portion 401 bent into a rectangular shape with bracket portions 38 each having guiding aperture 39 with lateral access 57 allowing an elevating fastener 40 to snap into the guiding aperture 39. The perforations 108 or creases allow the mounting plates 106 to snap off or to be worked off by exploiting bending-induced metal fatigue, for example, and thereby enable the sliding member 35 to insert into the adapting member 37. Accordingly, FIG. 5 illustrates the adapting member 37 after the snapping off, or otherwise removal of, the mounting plates 106 from the adapting member 37. Also shown is the remaining region of the ring 109 after the snapping off, or otherwise removal, of the frangible mounting tabs 106 attached to the flange portion 401 of the ring member 37.

Figure 6:
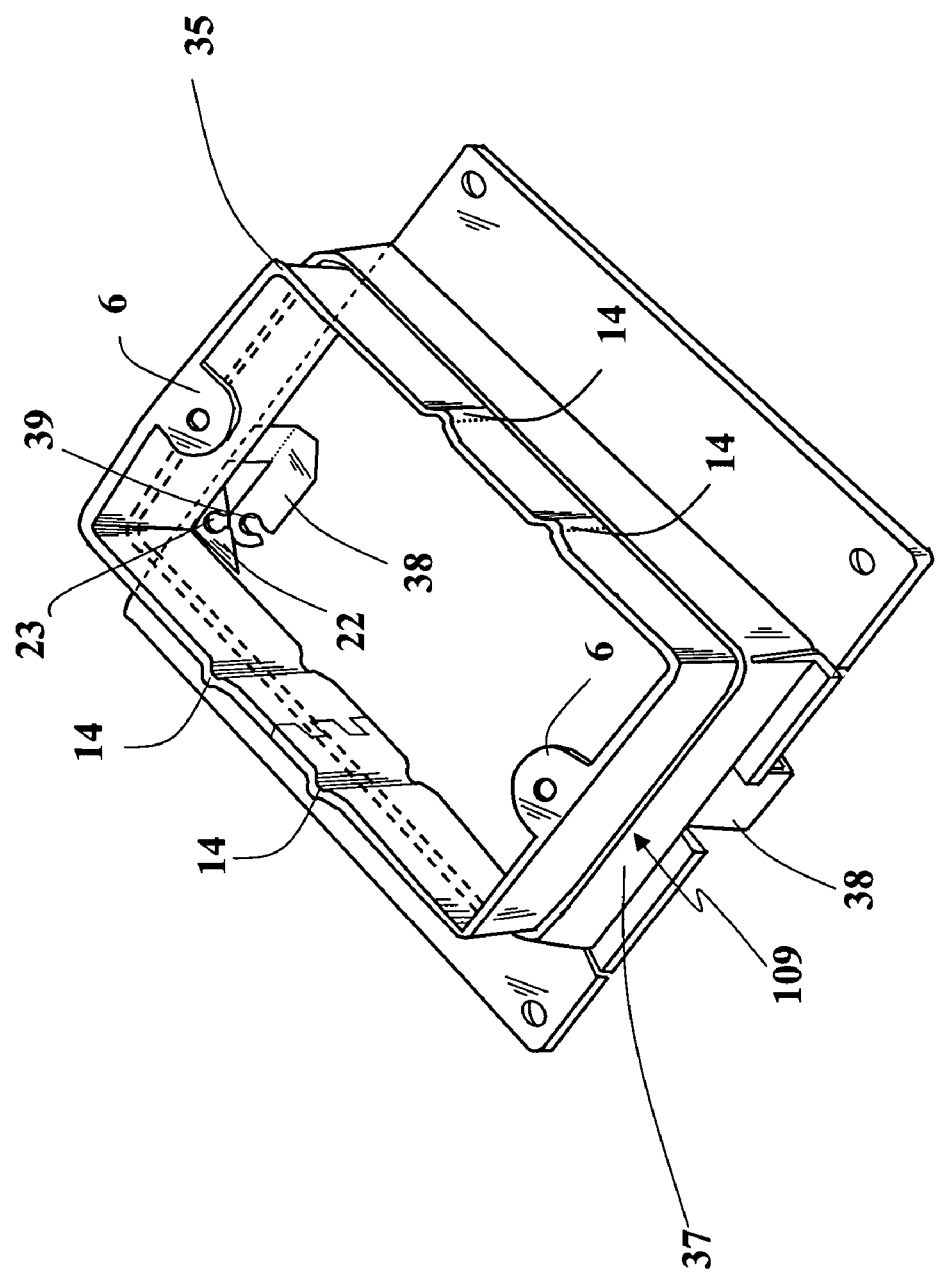
FIG. 6 is a isometric view of an exemplary assembly including the extending member embodiment within the adapting member embodiment of the present invention.

FIG. 6 illustrates in an isometric view the extending member 35 inserted into the ring member 37 so that the aperture 23 of the upper bracket 22 is aligned with the aperture 39 of the lower bracket 38. Also shown is the remaining region of the ring 109 after the snapping off, or otherwise removal, of the mounting tabs 106 previously attached to the ring member.

FIG. 7 illustrates in a top view the extending member 35 inserted into the adapting member 37 along the principal axis of extension, which in this view is out of the page. FIG. 7 shows the tapped or grooved end of a screw 40 as an example of an elevating fastener with the screw 40 engaging the upper bracket 22 and the lower bracket 38. The screw 40, preferably having a lock washer or grommet 41, is able to snap into the lower bracket 38 through the lower lateral access 57 (shown in FIG. 4) and into the upper bracket 22 through the upper lateral access 58. Also shown is the remaining region of the ring 109 after snapping off the mounting tabs 106 attached to the ring member.

Figure 8C:
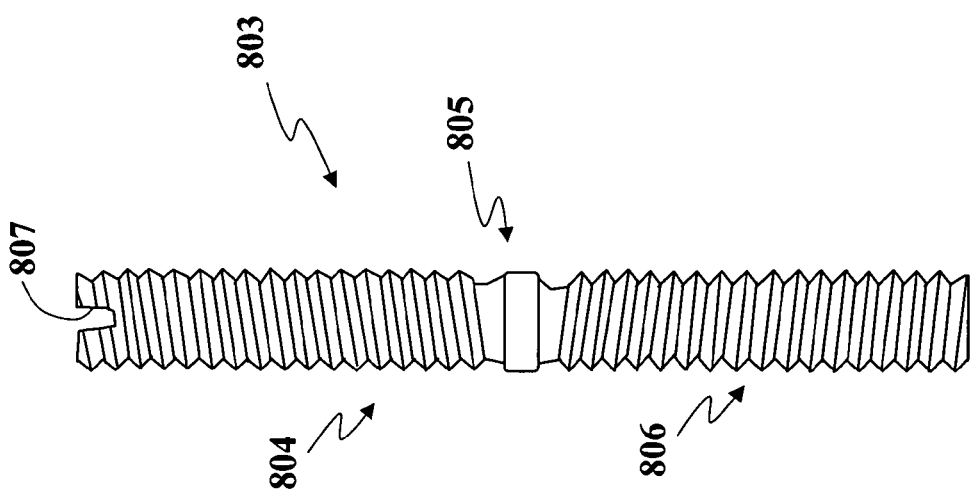
FIG. 8C is a side view of an exemplary elevating fastener of the present invention.
Figure 21:
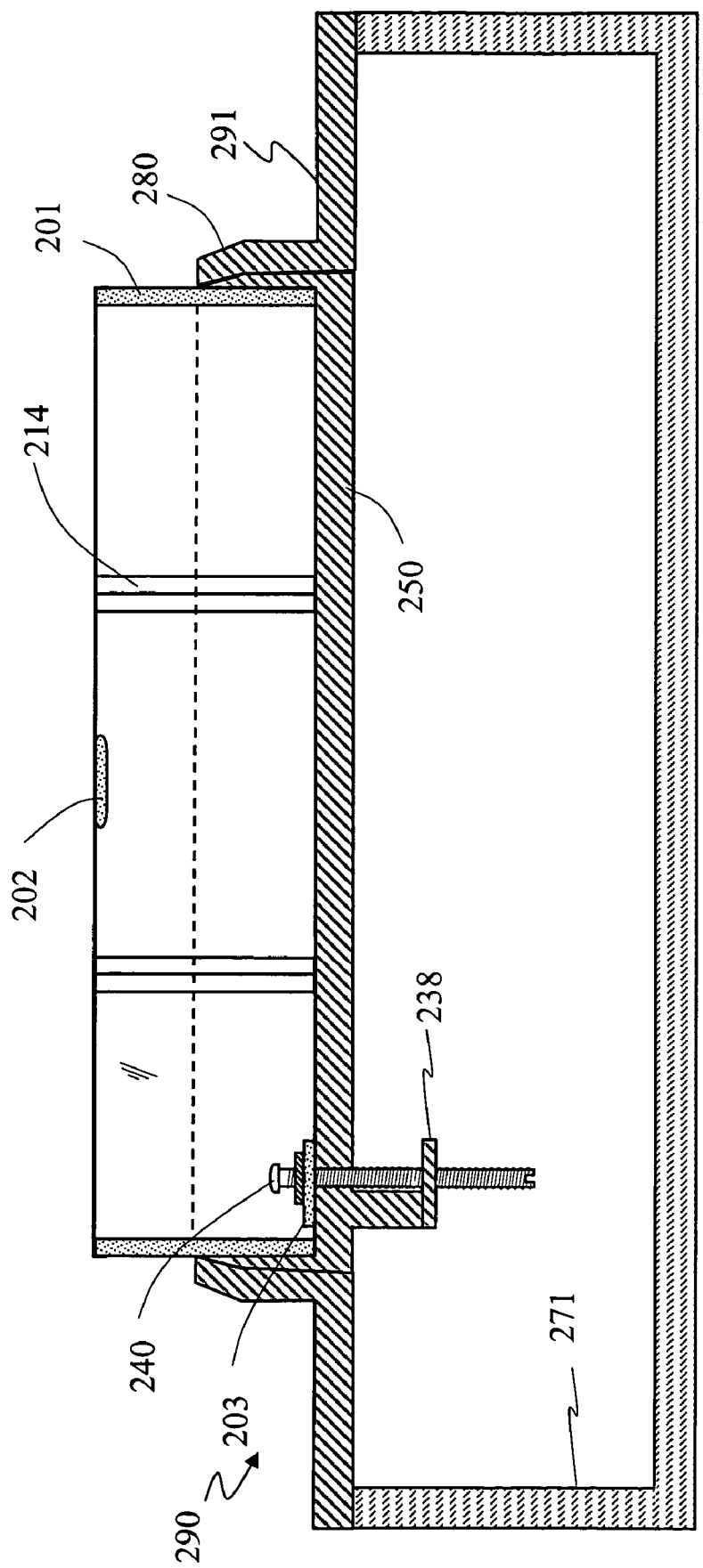
FIG. 21 is a cross-sectional view of an assembly of an alternative embodiment of the present invention.

FIG. 8A is a cross-sectional view of FIG. 7 at 8A illustrating the engagement of the upper bracket 22 and the lower bracket 38 via the elevating fasteners 40. Where tapped screws are used 40, lock washers 41 are also preferably used and grommets are used in alternative embodiments. In an orientation where the head of the screw 40 is below the ring mounting plate 38, the end of the screw distal from the head preferably has a grove whereby a flat head screw driver, for example, may be used to rotate the screw. Protrusions 14 are shown to run up and down, that is, parallel with the axis of extension. FIG. 8B illustrates in cross-sectional view an alternative embodiment having springs 34 inserted between the upper brackets 22 and the lower brackets 38. The springs 34 are preferably under compression to provide force to the extending member 35 and work to aid in the extension process. The orientation of the elevating fastener may be reversed as is illustrated in FIG. 21 below. In those embodiments (e.g., FIG. 8B and FIG. 21) of threaded screws having lock washers 41 or grommets where the head of the screw is above the slider mounting plate 22, a spring 34 may be inserted between the slider mounting plate 22, 203 and the ring mounting plate 38, 238 preferably in compression to increase the force in the extending direction. Illustrated in FIG. 8C is an alternative elevating fastener example that may be used in place of the single threaded screw. This alternative elevating fastener is a double thread screw 803 having threads in a first direction 804 above a median or transition region 805 and threads in a direction opposite 806 the first direction below the median or transition region 805. The double thread screw may be preferably rotated using a flat head screwdriver placed in a groove 807 at a distal end.

Figure 9:
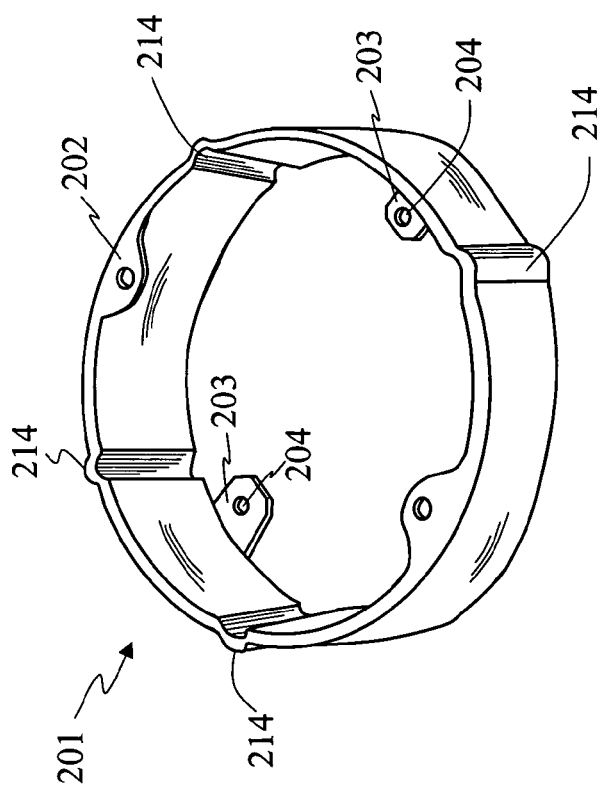
FIG. 9 is an isometric view of an exemplary alternative extending member of the present invention.

An alternative embodiment of the present invention includes a circular sliding member and either a rounded or a squareshaped adapting plate portions adapted to detachably attach to an electrical box, for example. Oval sliding members are accommodated in a fashion substantially similar to the circular examples that follow. FIG. 9 illustrates the circular sliding member 201 with electrical device mounting plates 202 and a plurality of referably linear protrusions 214 stamped into the sliding member wall preferably parallel with the axis of extension as shown in this example. The slider bracket, or upper bracket 203 connects the slider with the mud ring member by way of an elevating fastener. The upper bracket 203 has an aperture 204 which may be tapped to engage an elevating fastener such as a screw, for example.

Figure 11:
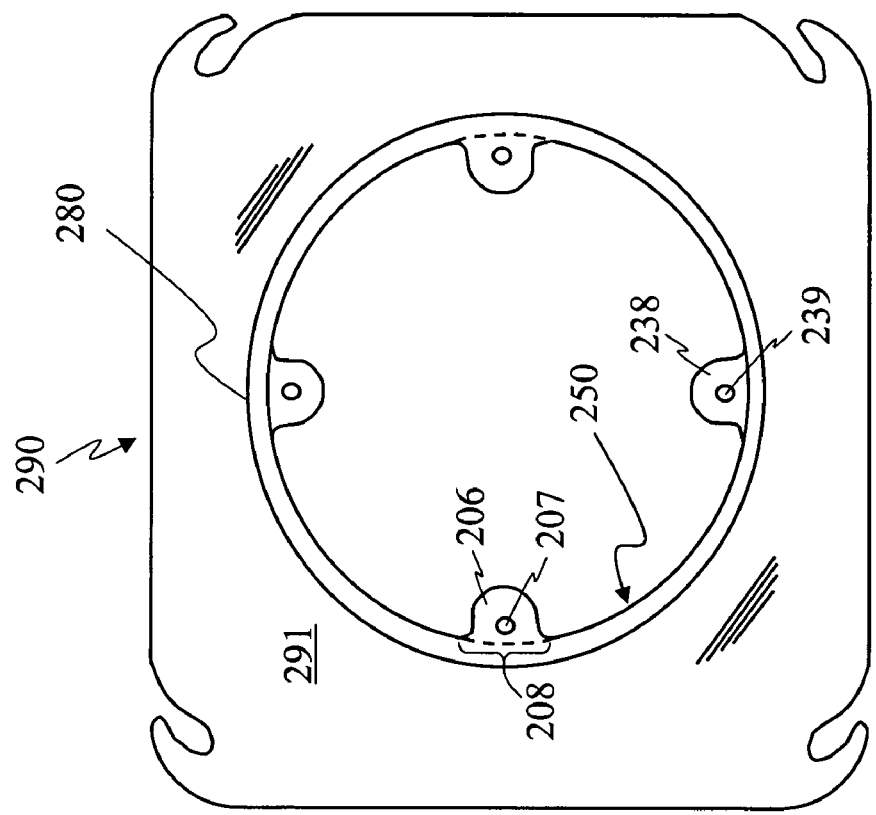
FIG. 11 is a top view of an alternative example of a mud ring member or adapting member embodiment of the present invention.
Figure 10:
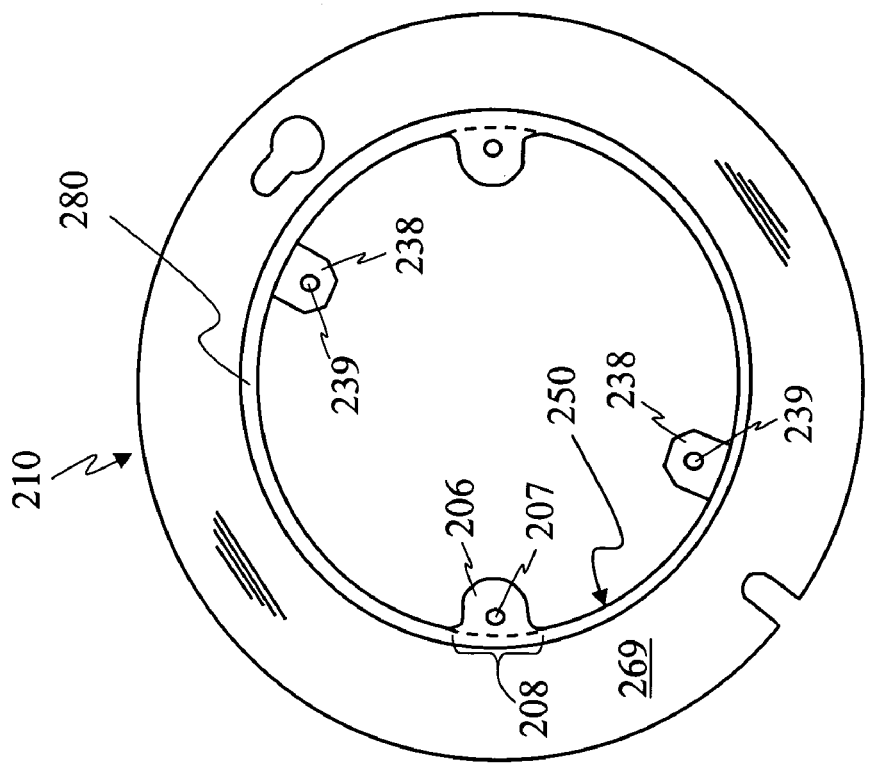
FIG. 10 is a top view of the exemplary alternative mud ring of the present invention.
Figure 13:
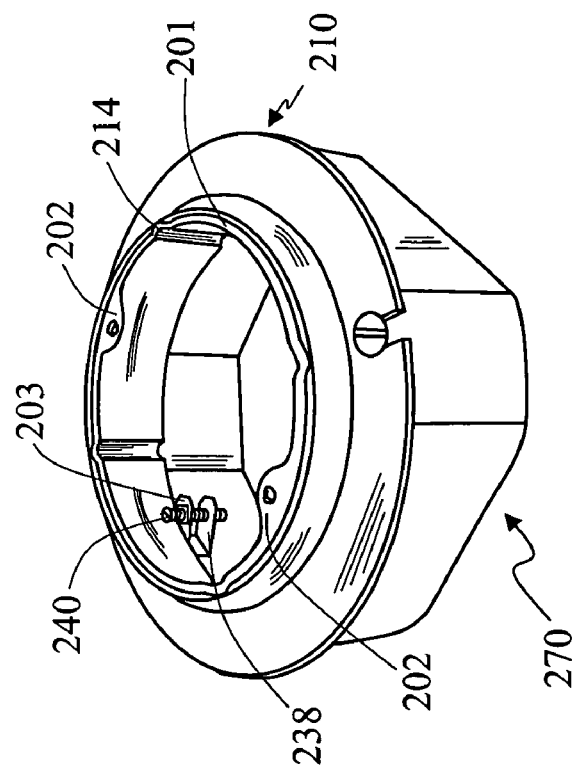
FIG. 13 is a perspective view of an extending member within an adapting member of an alternative embodiment of the present invention.
Figure 12:
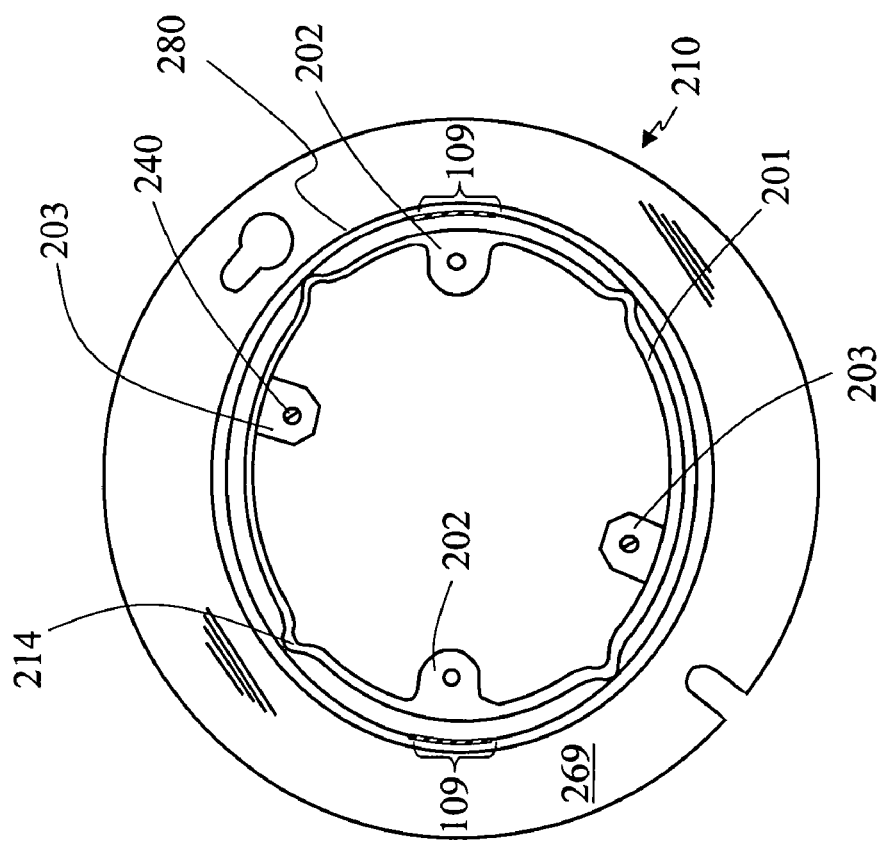
FIG. 12 is a top view of an assembly of an alternative embodiment of the present invention wherein the tabs or brackets of the mud ring have been removed.

FIG. 10 illustrates an adapting circular ring 210 with a circular base including at least one plug/switch mounting plate 206 and in this example, two plug/switch mounting plates 206 extending from the top portion of the flange 280 of the ring 210. As an example of the frangible device mounting plates, preferably perforations 208 or creases allow the mounting plate 206 to be snapped or worked off of the ring 210, or otherwise removed from the ring 210, enabling the sliding member 201 to be inserted into the adapting member 210 by way of the flange aperture formed or otherwise bordered by the flange inward side 250. The lower bracket 238 provides for the connecting of the sliding member 201 via the elevating fastener to the adapting ring. The lower bracket 238 has a ring aperture 239 which may be tapped to engage an elevating fastener such as a screw, where a preferred embodiment has a smooth rather than threaded guiding aperture 239. FIG. 11 illustrates an alternative mud ring 290 having a square base adapting plate 291 with an adapting circular ring 210. FIG. 12 illustrates in a top view an extending member 201 inserted into a ring member 210 showing the tapped end of a screw 240 having a groove, where the screw 240 engages the upper bracket 203. The protrusions 214 of the sliding member 201 are in contact with the inner wall 250 of the flange of the ring 210 which form the boundary of the ring aperture and thereby provide electrical and mechanical contact between the ring 210 and the sliding member 201. Also shown is the remaining region of the ring 109 after snapping off or otherwise removing the frangible device mounting tabs 206 previously extending from the top edge of the flange 280 of the ring member 210 into the aperture formed by the flange 280 and substantially parallel to the adapting plate portion 269 of the mud ring or adapting member 210. An alternative embodiment of the ring member 210 is made without electrical device mounting tabs. FIG. 13 illustrates in a perspective view the extending member 201 inserted into the adapting member 210 so that the aperture 204, as illustrated in FIG. 9, of the upper bracket 203 is aligned with the aperture 239, as illustrated in FIG. 10, of the lower bracket 238. The lower bracket 238 is shown extending into the well of an example octagonal electrical box 270. Also shown is the screw 240 engaging the upper bracket 203 and the lower bracket 238.

FIG. 12 illustrates in a top view an extending member 201 inserted into a ring member 210 showing the tapped end of a screw 240 having a groove, where the screw 240 engages the upper bracket 203. The protrusions 214 of the sliding member 201 are in contact with the inner wall 250 of the flange of the ring 210 which form the boundary of the ring aperture and thereby provide electrical and mechanical contact between the ring 210 and the sliding member 201. Also shown is the remaining region of the ring 109 after snapping off or otherwise removing the frangible device mounting tabs 206 previously extending from the top edge of the flange 280 of the ring member 210 into the aperture formed by the flange 280 and substantially parallel to the adapting plate portion 269 of the mud ring or adapting member 210. An alternative embodiment of the ring member 210 is made without electrical device mounting tabs. FIG. 13 illustrates in a perspective view the extending member 201 inserted into the adapting member 210 so that the aperture 204, as illustrated in FIG. 9, of the upper bracket 203 is aligned with the aperture 239, as illustrated in FIG. 10, of the lower bracket 238. The lower bracket 238 is shown extending into the well of an example octagonal electrical box 270. Also shown is the screw 240 engaging the upper bracket 203 and the lower bracket 238.

Figure 15:
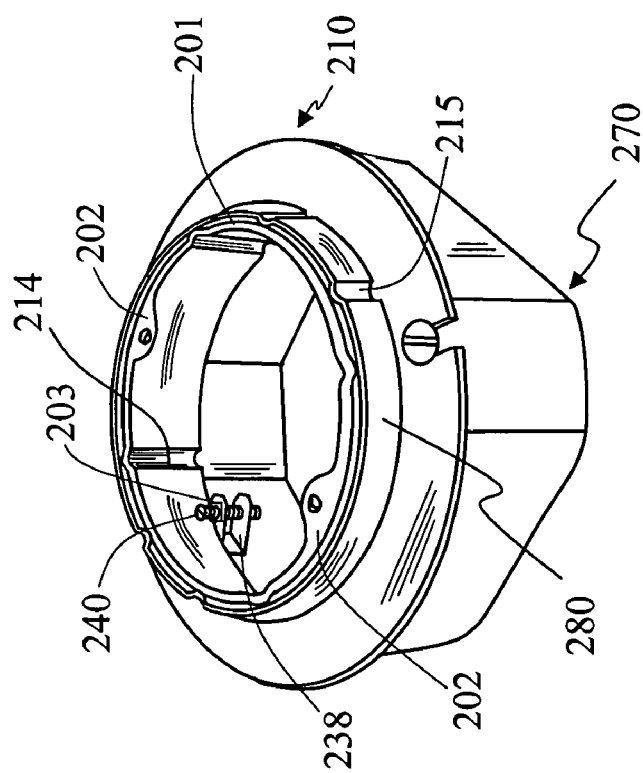
FIG. 15 is a perspective view of an extending member within an adapting member of an alternative embodiment of the present invention.
Figure 14:
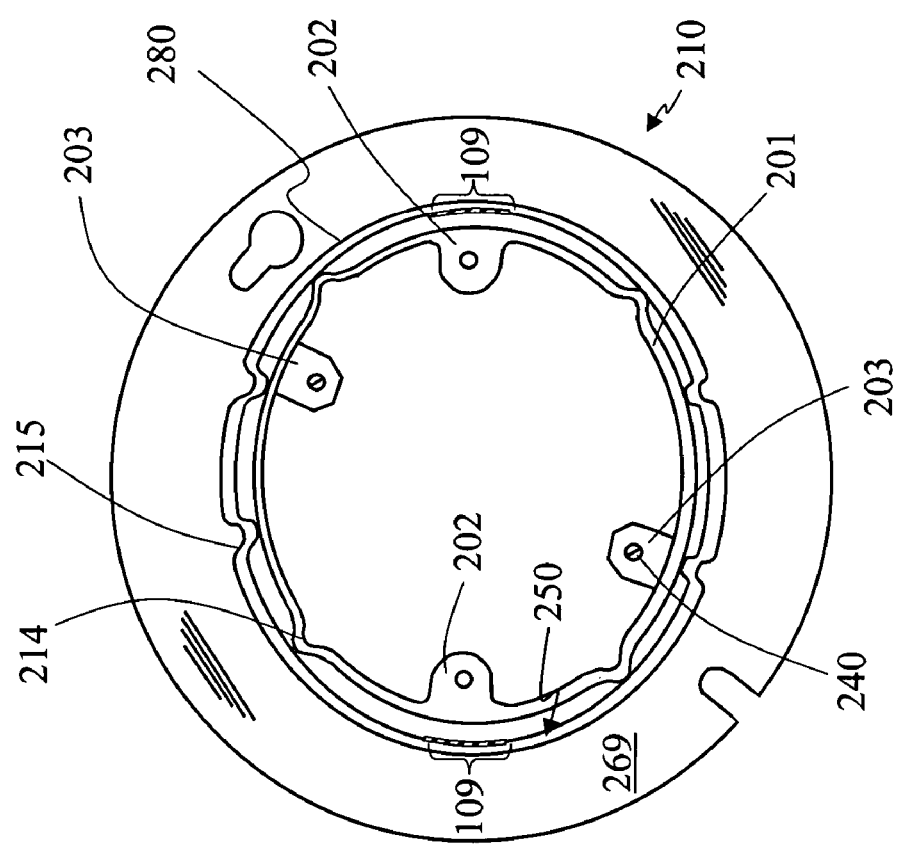
FIG. 14 is a top view of an assembly of an alternative embodiment of the present invention.
Figure 17:
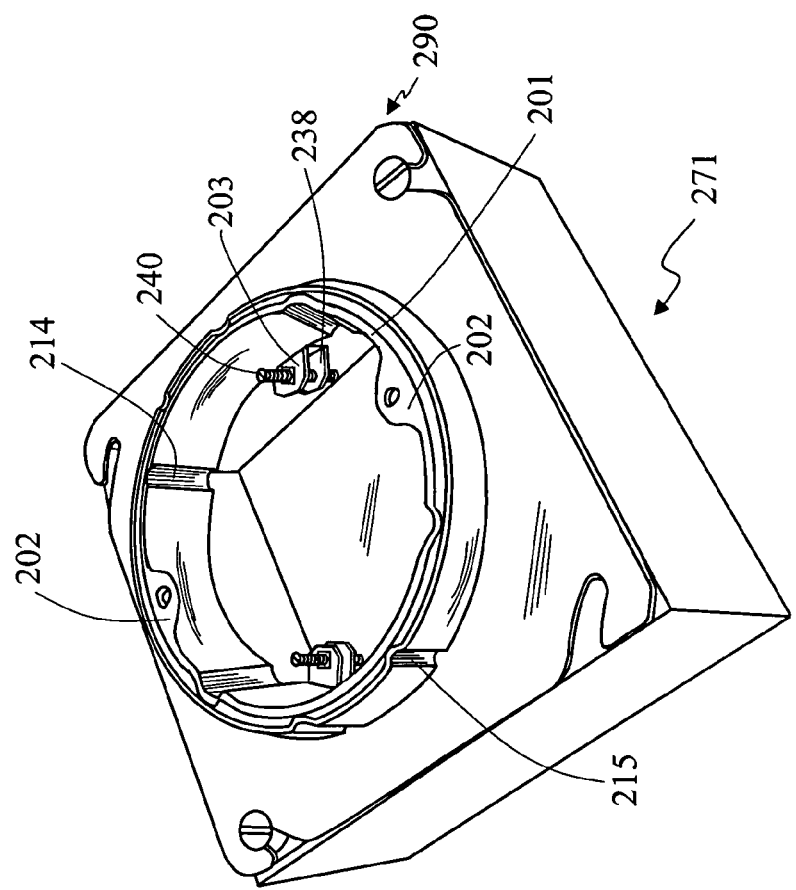
FIG. 17 is a perspective view of an extending member within an adapting member of an alternative embodiment of the present invention.
Figure 16:
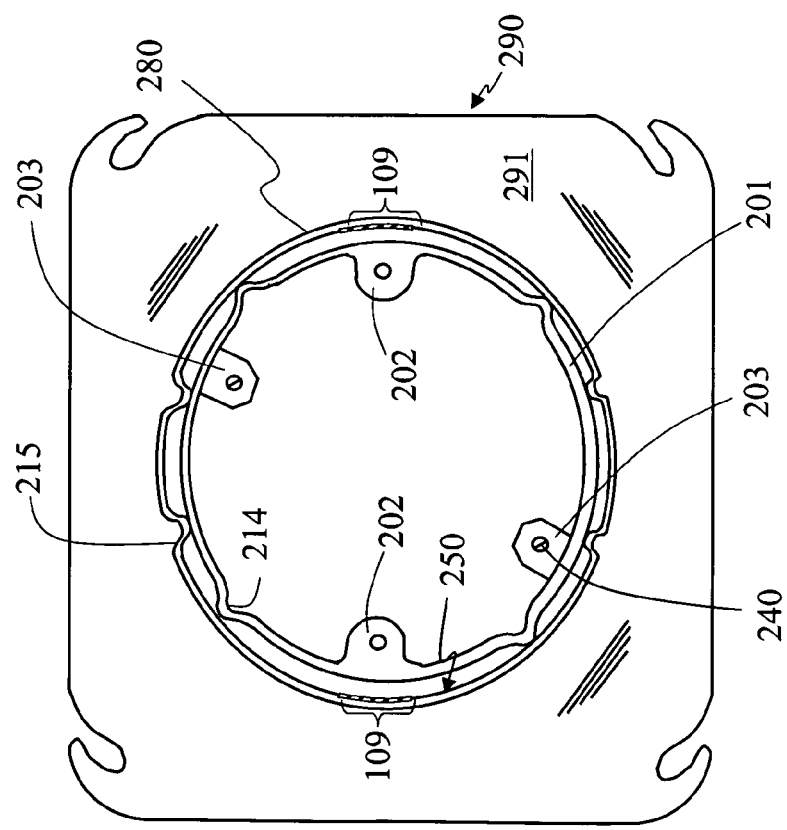
FIG. 16 is a top view of an assembly of an alternative embodiment of the present invention.

FIGS. 14-17 illustrate an alternative embodiment of an adapting ring 210 with a plurality of protrusions 215 preferably stamped into the ring wall. The protrusions of the adapting ring 215 are in contact with the outer wall of the sliding member 201 and thereby provide electrical and mechanical contact between the ring 210 and the sliding member 201. FIG. 14 illustrates, in a top view, the alternative embodiment where the ring protrusions 215 contact the outer wall of the slider 201 and the slider protrusions 214 contact the inner wall of the flange 280 of the mud ring 210. In an alternative embodiment, the slider 201 does not have protrusions, so that the assembly preferably relies upon the adapting ring protrusions 215 from the flange inner wall 250 for electrical connectivity. FIG. 15 illustrates, in an isometric view, the alternative embodiment where the ring protrusions 215 contact the outer wall of the slider and the slider protrusions 214 contact the inner wall of the flange 280 of the mud ring 210. FIG. 16 illustrates, in a top view, the alternative embodiment where the ring protrusions 215 contact the outer wall of the slider 201 and the slider protrusions 214 contact the inner wall 250 of the flange 280 of the mud ring 290 having a rectangular adapting plate 291 for detachably attaching to a rectangular electrical box. Also illustrated is the region of the flange remaining 109 after the removal of the mounting plates 206 shown in FIG. 11. FIG. 17 illustrates, in an isometric view, an alternative embodiment of the mud ring 290 adapted to detachably attach to a rectangular electrical box 271 where the ring protrusions 215 contact the outer wall of the slider 201 and the slider protrusions 214 contact the inner wall of the flange 280 of the mud ring 290. FIG. 18 illustrates, in a top view, the alternative embodiment where the slider protrusions 214 contact the inner wall 250 of the flange 280 of the mud ring 290 having a rectangular adapting plate 291 for detachably attaching to a rectangular electrical box. FIG. 19 illustrates, in an isometric view, an embodiment of the mud ring 290 adapted to detachably attach to a rectangular electrical box 271 where the slider protrusions 214 contact the inner wall 250 of the flange 280 of the mud ring 290.

Figure 20:
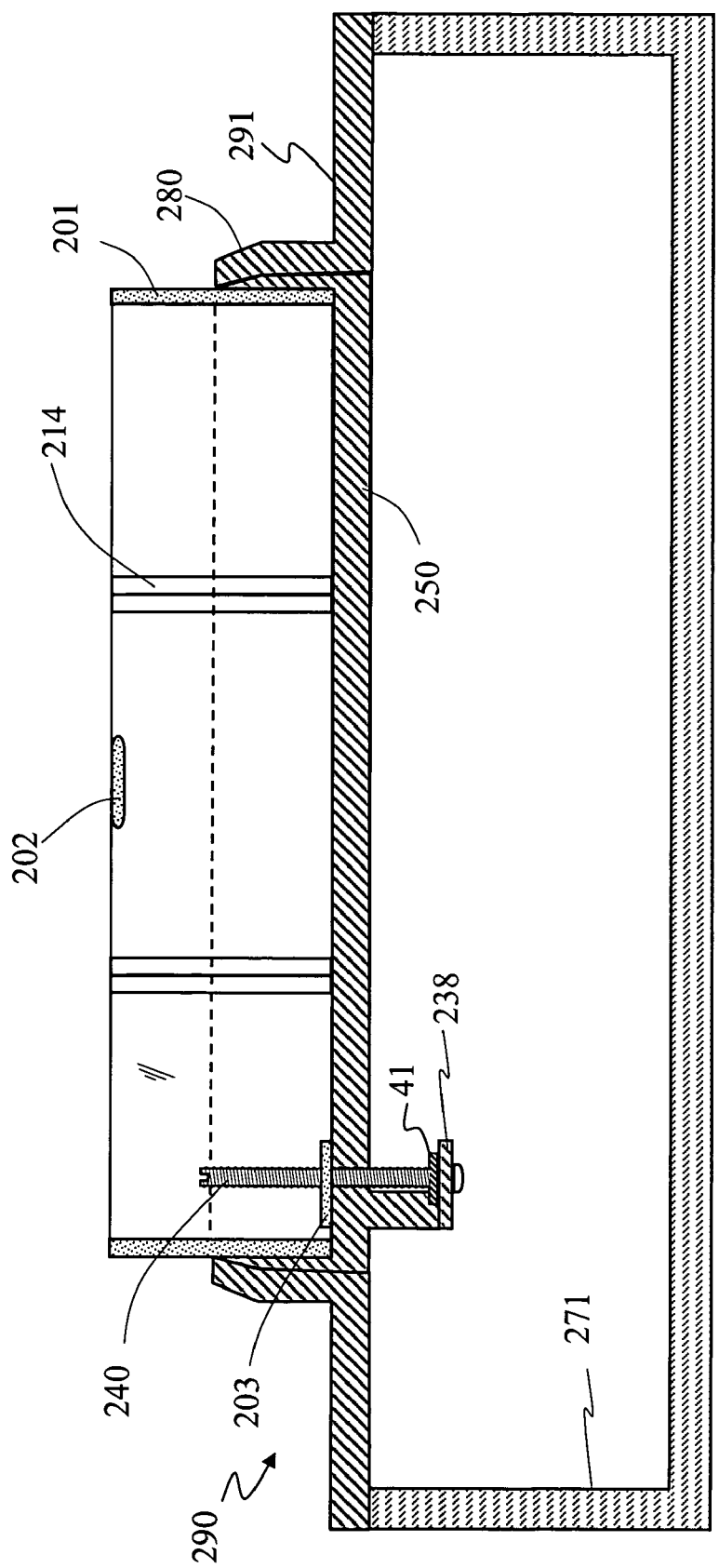
FIG. 20 is a cross-sectional view of an assembly of an alternative embodiment of the present invention.
Figure 22:
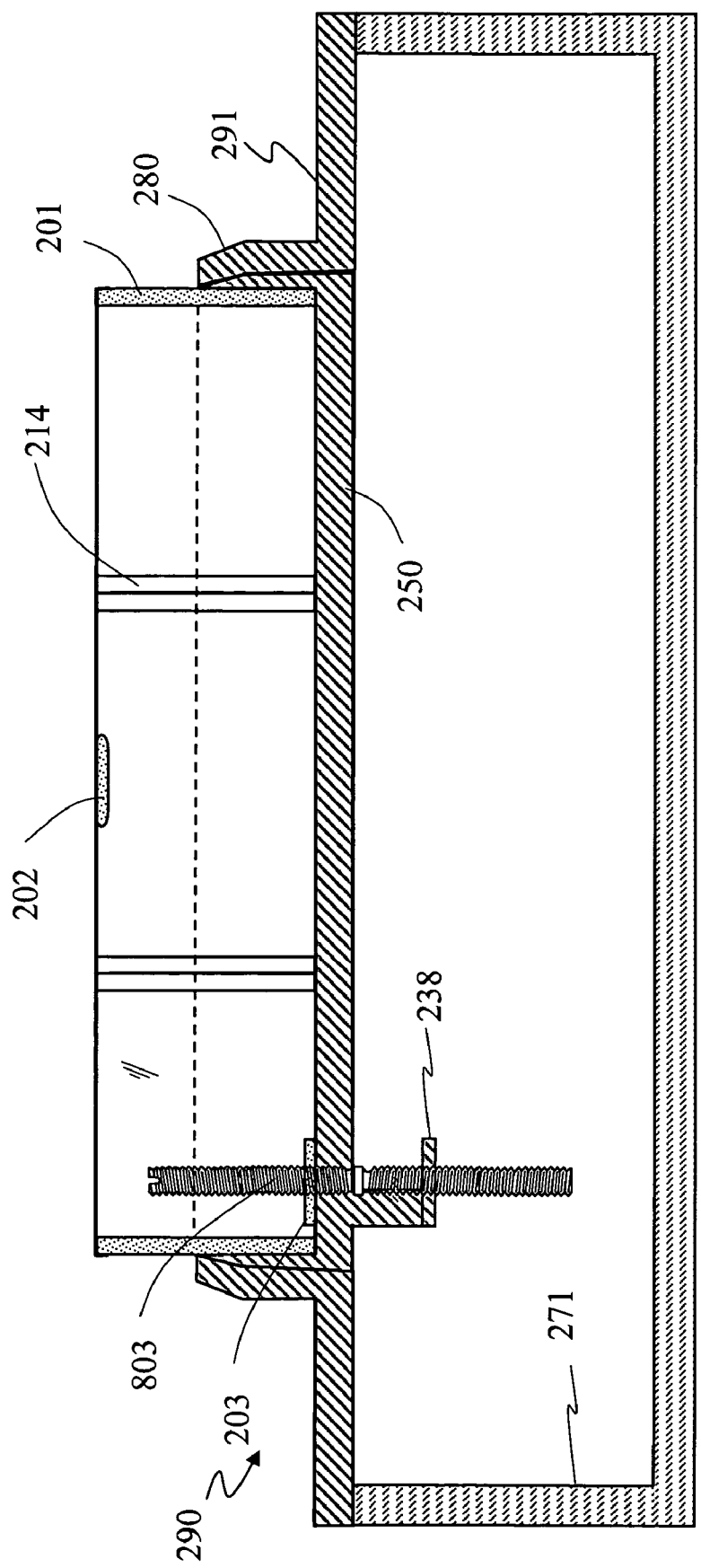
FIG. 22 is a cross-sectional view of an assembly of an alternative embodiment of the present invention.

FIG. 20 is cross-sectional view of FIGS. 18 and 19 taken at 20, respectively, illustrating the mounting plate of the ring 202 and the fastener 240 connecting with the bracket surface of the sliding member 203 and the bracket surface of the ring 238. The example slider protrusions 214 are shown to run up and down in this view, that is, parallel to the axis of extension. As previously illustrated in FIG. 8B, a spring 34 may be place between the washer 41 or grommet and the slider mounting plate to increase extending force. FIG. 21 illustrates in cross-sectional view an alternative orientation of the elevating fastener 240. In addition, a spring may be inserted between the slider mount plate 203 and the ring mounting plate 238 to aid in the slider extending force. FIG. 22 illustrates in cross-sectional view an alternative fastener, the double thread screw 803.

Figure 23C:
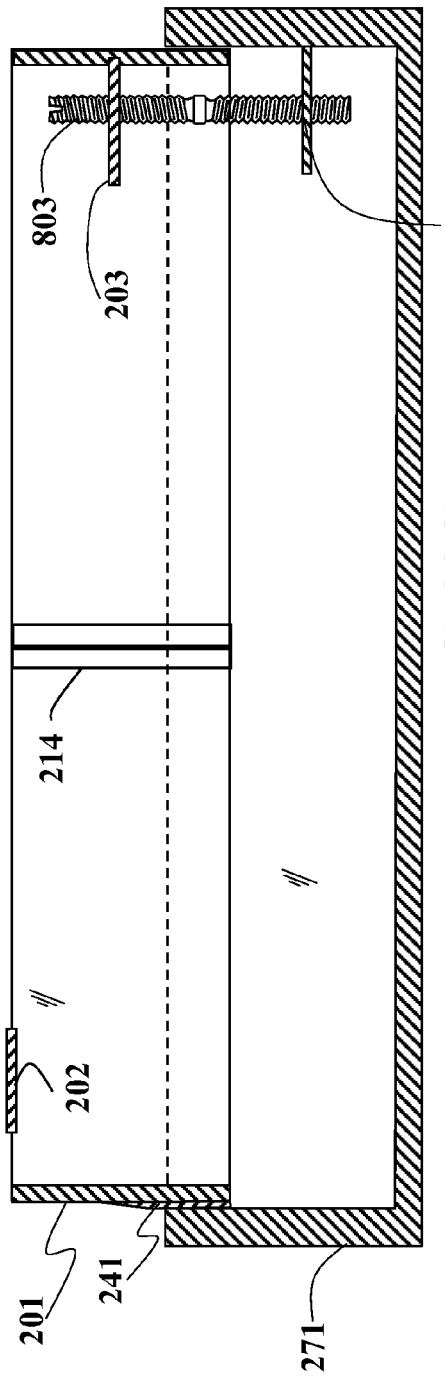
FIG. 23C is a cross-sectional view of an alternative embodiment of the present invention engaging an electrical box.
Figure 23D:
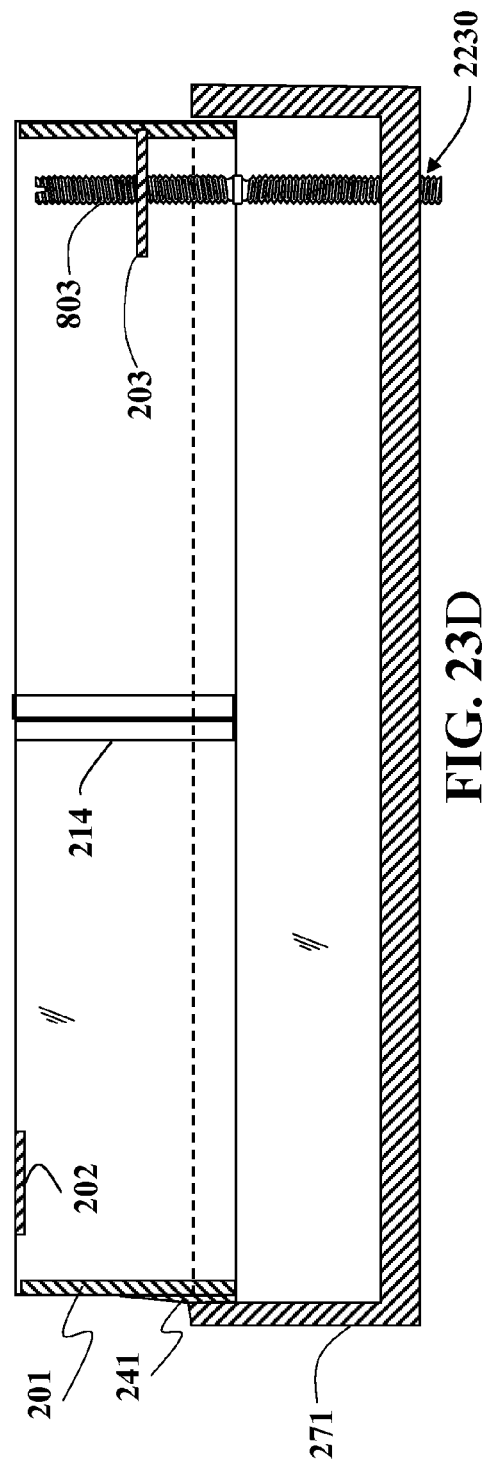
FIG. 23D is a cross-sectional view of an alternative embodiment of the present invention engaging an electrical box.

Rather than the one or more lower brackets 203 (FIG. 22) being fixedly attached to the ring 290, in an alternative embodiment of the present invention, the one or more lower brackets 2231 to the box 271 shown in cross-section view FIG. 23A. The extending member 201 remains in electrical and mechanical contact with the box by way of the one or more screws 803 or other fasteners as disclosed above by engaging the one or more upper brackets 203 and the one or more lower brackets 2231. Depending on the dimensions of the box 271 relative to the extending member 201, a ring 290 or other adapting member thereby becomes optional in this alternative embodiment as a separate member and otherwise the functionality of the ring 290 is taken on by the box 271. An alternative embodiment illustrated in FIG. 23B has at least one tapped or threaded aperture 2230 of the electrical box 271 rather than the one or more lower brackets 2231 for engaging the screw 803. FIG. 23C illustrates an embodiment in cross cut view of FIG. 20 where in place of an adapting member or ring, the electrical box has a mounting surface or bracket 2331 and the extending member or slider 201 is in close proximity to the walls of the box 271. Mechanical contact and electrical contact illustrated in FIGS. 23C and 23D are enhanced where the embodiments include one or more protrusions 214 from the slider 201 outer surface contacting at least one of the inside walls of the box 271.

In several embodiments, one or more fasteners provide a mechanical means of extending and retracting the slider relative to the ring. While screws are preferred, other embodiments do not use fasteners and instead rely on the stiction provided by the ring and or slider protrusions acting against one another. An alternative to the screw faster is illustrated in FIGS. 24A-24F. In FIG. 24A, the front view of a comb pin 70 is illustrated. In the top view of the comb pin 70 (FIG. 24B), a groove 71 is provided for engagement with a flat screwdriver or equivalent tool.

The side view (FIG. 24C) of the comb pin 70 shows the pin to be substantially flat. In FIG. 24D, the comb pin 70 is positioned to engage 76 representative upper 72 and lower brackets 74 having substantially slotted apertures 73, 75. The upper bracket 72, in this example, is contiguous with an extending member (not shown) and the lower bracket 74 is contiguous with a ring member (not shown). FIG. 24E illustrates the insertion of the comb pin through the upper and lower brackets. With a ninety degree turn 78 of the comb pin 70, the spacing 79 between the upper 72 and lower brackets 74 is fixed by the comb pin as shown in a side view in FIG. 24F. The comb pin 70 thereby provides mechanical and electrical connectivity between the upper 72 and lower brackets 74. FIG. 24G illustrates an alternative embodiment wherein a spring 56 surrounds the portion of the comb pin 70 between the upper 72 and lower brackets 74 and effects tension between these brackets 72, 74 providing additional mechanical support to the extending member and electrical connectivity between the extending member (not shown) and the adaptor or ring member (not shown).

Figure 25:
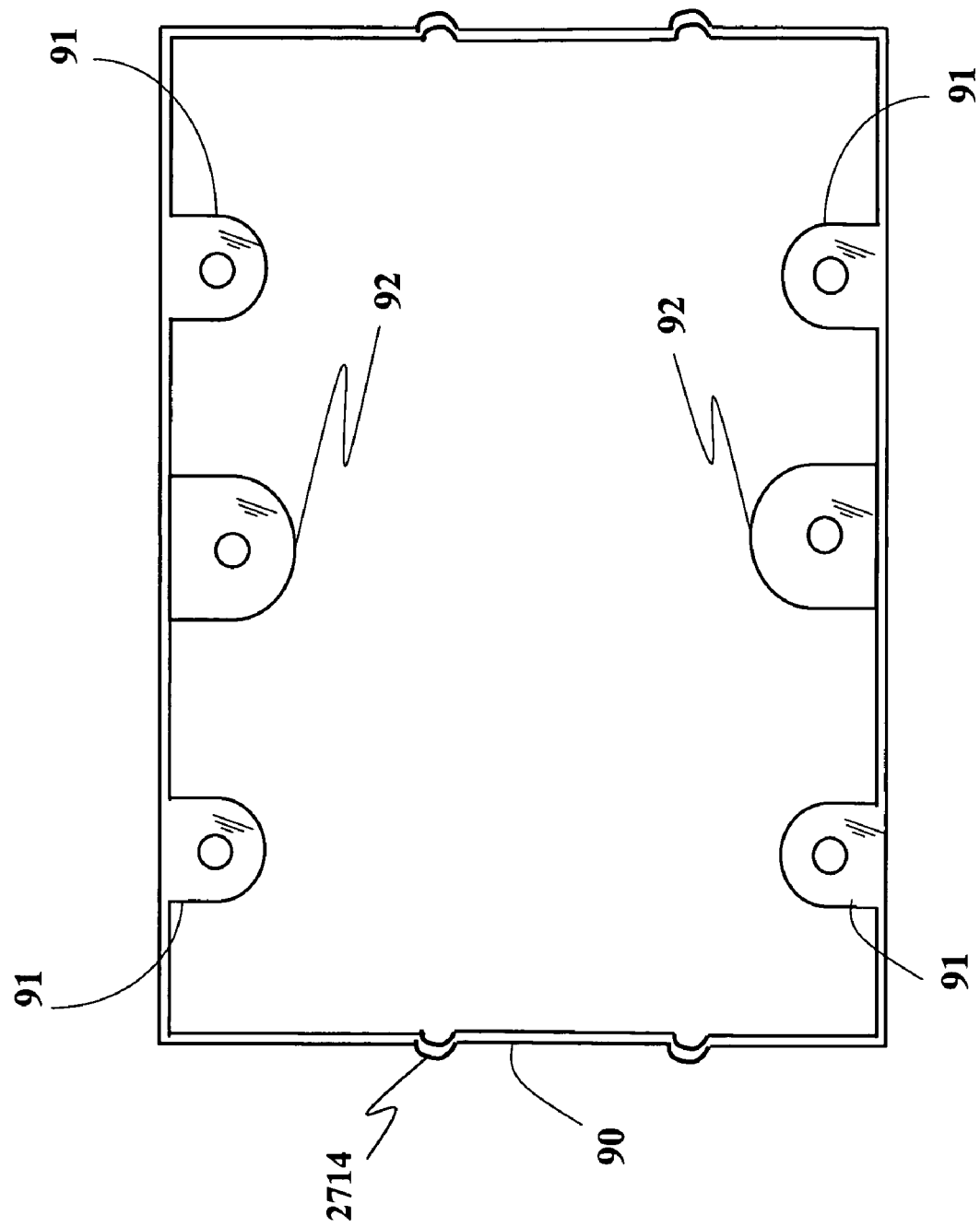
FIG. 25 is a top view of a two-gang extending member embodiment of the present invention.
Figure 26:
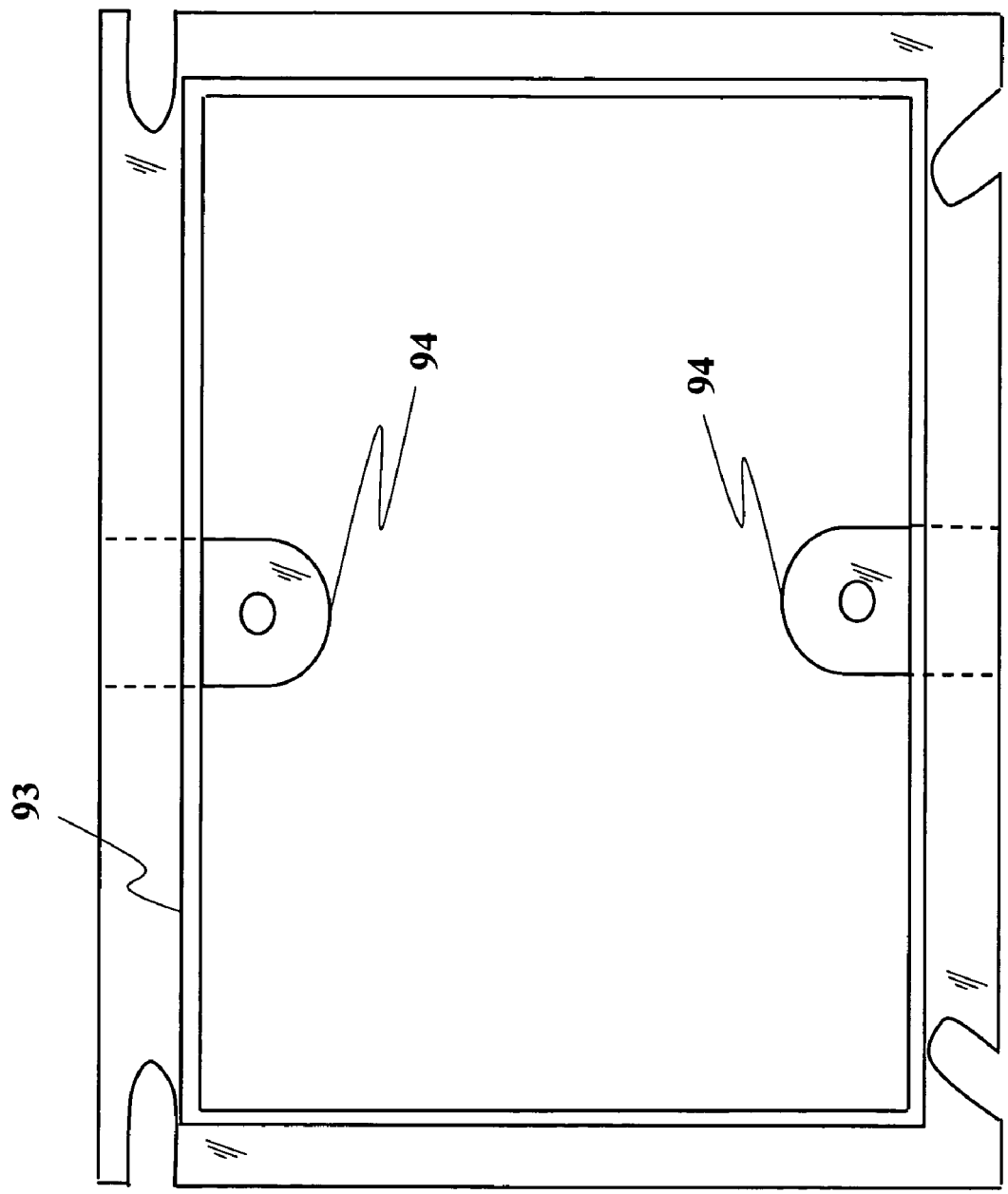
FIG. 26 is a top view of a two-gang adapting member embodiment of the present invention.
Figure 27:
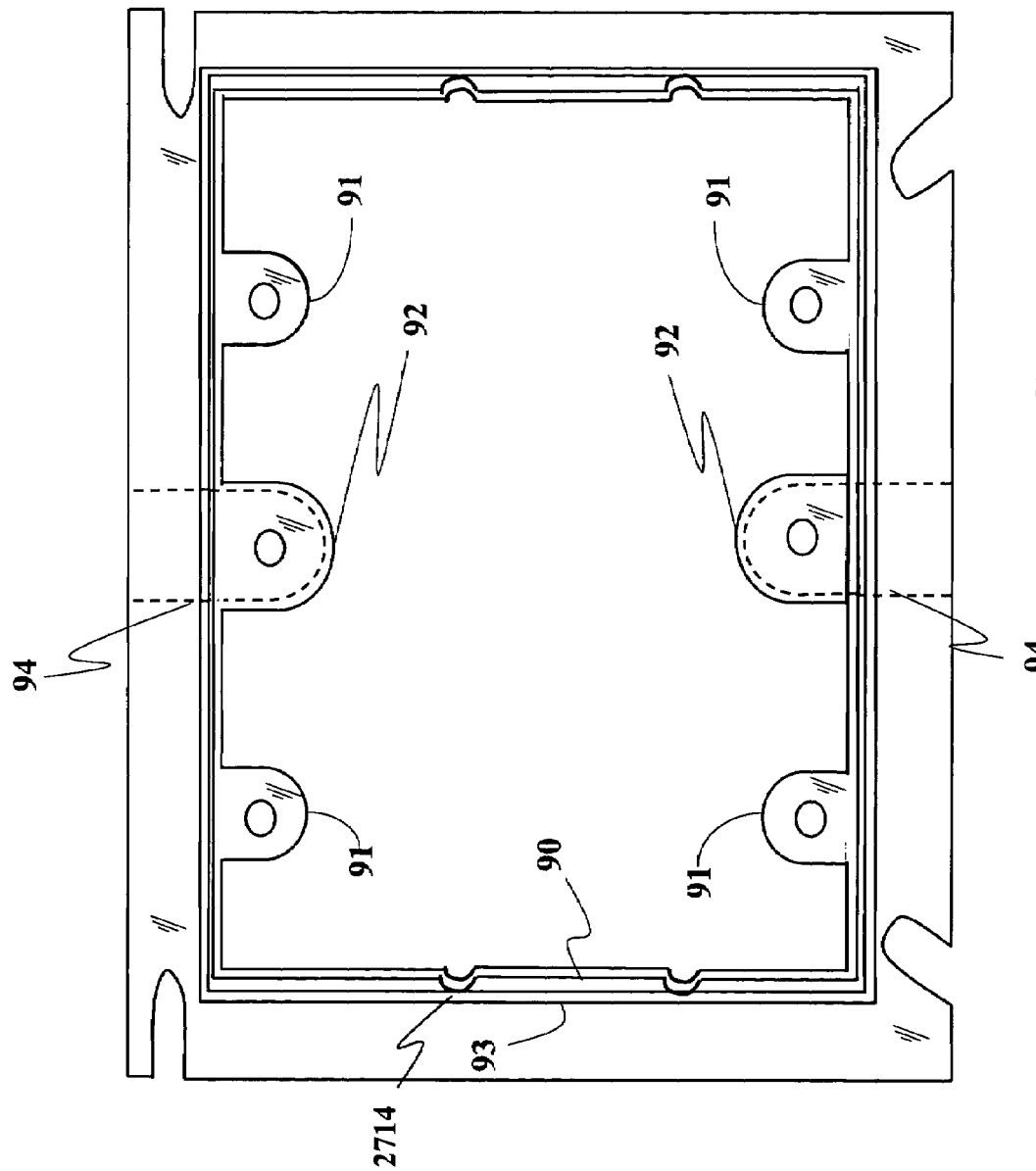
FIG. 27 is a top view of a two-gang assembly embodiment of the present invention.

FIG. 25 illustrates an example two-gang extending member 90 embodiment of the present invention. The switch/plug or other electrical device mounting plates 91 are each positioned to receive a switch or a plug and together mount two such devices in tandem. The upper brackets 92 of the elevating member 90 are, in this example, substantially aligned along a line of symmetry that also bisects the mounted plugs and/or switches. The two-gang mud ring 90 has one or more protrusions 2714 for contacting the inner wall FIG. 26 illustrates an example two-gang adapting member 93 or mud ring embodiment of the present invention. The lower brackets 94 of the adapting member 93 are substantially along the same line of symmetry as the upper brackets 92 (FIG. 25) of the elevating member 90. FIG. 27 illustrates the two-gang extending member inserted into the two-gang adapting member. As with the several embodiments of the single switch/plug electrical box extenders described above, the two-gang embodiments include the various fastening and elevating means and bracket embodiments for laterally insertable fasteners as disclosed above.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. While illustrated as a single assembly, the adapting member and, as an assembly, the extending member, are applicable to an array of attachable electrical devices and the adapting member and the assembly are applicable to an array of assemblies mounted to electrical boxes of extended size (e.g., elongated rectangles receiving several assemblies).

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. While the drawings reflect a electrical box, ring, or adapting member, and the sleeve, or extending member, all made of galvanized steel, the invention may be embodied with members each made of plastic, preferably fire resistant plastic, metal, preferably galvanized steel, ceramic or combinations thereof. In those embodiments having the electrical box, adapting member and extending member each made of plastics and ceramics or combinations thereof, it is preferred that electrical conductivity be maintained by reverse thread screws as extending fasteners. In addition, the term electrical box is used generically to refer to grounded electrical housing of three-dimensional shapes including boxes of rectangular sides, boxes of square sides, and boxes of cylindrical shapes with circular or oval tops and bottoms or other shapes acceptable in electrical applications and grounded electrical housing which may accommodate one or more plugs and or switches.

In addition to the equivalents of the claimed elements, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. An electrical box mounting assembly comprising:
    a mud ring comprising:
        an adapting plate member comprising:
            an outward side;
            an inward side;
            and an edge;
            a mud ring aperture oriented substantially about a principal axis of extension of the adapting plate member; and
            at least one adaptor fastener mounting plate for receiving a fastener wherein the at least one adaptor fastener mounting plate extends from the edge of adapting plate member in the direction of the mud ring aperture; and
            a flange bordering the mud ring aperture of the adapting plate member and substantially perpendicular to, and extending in the direction of the outward side of, the adapting plate member and oriented substantially about the principal axis of extension of the adapting plate member; the flange comprising:
                an inward side;
                an outward side;
                and a frangible electrical device mounting plate extending into the mud ring aperture from the inward side of the flange.

2. The electrical box mounting assembly as claimed in claim 1 wherein at least one adaptor fastener mounting plate has a laterally open aperture adapted for lateral insertion of a fastener.

3. The electrical box mounting assembly as claimed in claim 1 wherein at least one protrusion extends from the inward side of the flange and the at least one protrusion is oriented substantially parallel with the principal axis of extension.

4. An electrical box mounting assembly comprising:
    a mud ring comprising:
        an adapting plate member plate comprising:
            an outward side;
            an inward side;
            and an edge;
            a mud ring aperture oriented substantially about a principal axis of extension of the adapting plate member; and
            at least one adaptor fastener mounting plate for receiving a fastener wherein the at least one adaptor fastener mounting plate extends from the edge of adapting plate member in the direction of the mud ring aperture; and
            a flange bordering the mud ring aperture of the adapting plate member and substantially perpendicular to, and extending in the direction of the outward side of, the adapting plate member and oriented substantially about the principal axis of extension of the adapting plate member the flange comprising:
                an inward side;
                an outward side;
                and a frangible electrical device mounting plate extending into the mud ring aperture from the inward side of the flange; and
    an extending member wherein the extending member is oriented about the principal axis of extension of the adapting plate member and in close proximity to the inward side of the flange; wherein the outer surface of the extending member has at least one protrusion, the at least one protrusion oriented substantially parallel with the principal axis of extension in contact with the inward side of the flange, and at least one extender fastener mounting plate adapted to receive a fastener attached to the extending member wherein each of the at least one extension fastener mounting plates has an associated adaptor fastener mounting plate adapted to receive a fastener; and wherein each extender fastener mounting plate is substantially aligned with the associated adaptor fastener mounting plate; and at least one fastener adapted to detachably attach the mud ring to the extending member via each of the at least one aligned extender fastener mounting plate and the at least one aligned adaptor fastener mounting plate.

5. The electrical box mounting assembly as claimed in claim 4 wherein at least one extender fastener mounting plate has a laterally open aperture adapted for a lateral insertion of the at least one fastener.

6. The electrical box mounting assembly as claimed in claim 4 wherein the extending member comprises a polyhedron-shaped surface with substantially rectangular-shaped facets about the principal axis of extension.

7. The electrical box mounting assembly as claimed in claim 4 wherein the extending member comprises a substantially tubular surface substantially circular in shape about and in a plane perpendicular to the principal axis of extension.

8. The electrical box mounting assembly as claimed in claim 4 wherein the extending member comprises a substantially tubular surface substantially oval in shape about and in a plane perpendicular to a principal axis of extension.

9. An electrical box mounting assembly comprising:
  an adapting member comprising:
    an adapting plate member comprising:
    an outward side;
    an inward side;
    a flange comprising an inward side;
    an adapting plate member aperture oriented substantially about a principal axis of extension of the adapting plate member; and
    at least one adaptor fastener mounting plate comprising an end section with an aperture, the least one adaptor fastener mounting plate extending from the edge of adapting plate member in a direction toward the inward side of said flange and with the end section substantially parallel with the inward side of the adapting member and beneath said flange and adapted to receive a fastener; each of the at least one adaptor fastener mounting plates having an associated extender fastener mounting plate for receiving a fastener; and
  wherein said flange is coextensive with the adapting plate member aperture and substantially perpendicular to, and extending in the direction of the outward side of, the adapting plate member and oriented substantially about the principal axis of extension of the adapting plate member; wherein
    at least one protrusion extends from the inward side of the flange and the at least one protrusion is oriented substantially parallel with the principal axis of extension;
  and
    an extending member oriented about the principal axis of extension of said adapting member and in close proximity to the inward side of said flange, the extending member comprising:
    an outer surface; and
    at least one extender fastener mounting plate, each extender fastener mounting plate fixedly attached to the extending member and having an aperture; each extender fastener mounting plate aperture substantially aligned with the associated adaptor fastener mounting plate aperture; and
    at least one fastener for detachably attaching said adapting member to said extending member by way of the aligned adaptor fastener mounting plate aperture and the extending fastening mounting plate aperture.

10. The electrical box extender as claimed in claim 9 wherein the extending member has a polyhedron-shaped surface with substantially rectangular-shaped facets about the principal axis of extension.

11. The electrical box extender as claimed in claim 9 wherein the extending member has a tubular-shaped surface with substantially circular about the principal axis of extension.

12. The electrical box extender as claimed in claim 9 wherein the extending member has a tubular-shaped surface with substantially oval about the principal axis of extension.

13. An electrical box mounting assembly comprising:
  an adapting member comprising:
    an adapting plate member comprising:
    an outward side;
    an inward side;
    a flange comprising an inward side;
    an adapting plate member aperture oriented substantially about a principal axis of extension of the adapting plate member; and
    at least one adaptor fastener mounting plate comprising an end section with an aperture, the least one adaptor fastener mounting plate extending from the edge of adapting plate member in a direction toward the inward side of said flange and with the end section substantially parallel with the inward side of the adapting member and beneath said flange and adapted to receive a fastener; each of the at least one adaptor fastener mounting plates having an associated extender fastener mounting plate for receiving a fastener; and
  wherein said flange is coextensive with the adapting plate member aperture and substantially perpendicular to, and extending in the direction of the outward side of, the adapting plate member and oriented substantially about the principal axis of extension of the adapting plate member wherein at least one protrusion extends from the inward side of the flange and the at least one protrusion is oriented substantially parallel with the principal axis of extension;
  and
    an extending member oriented about the principal axis of extension of said adapting member and in close proximity to the inward side of said flange, the extending member comprising:
    an outer surface; and
    at least one extender fastener mounting plate, each extender fastener mounting plate fixedly attached to the extending member and having an aperture; each extender fastener mounting plate aperture substantially aligned with the associated adaptor fastener mounting plate aperture; and
    at least one fastener for detachably attaching said adapting member to said extending member by way of the aligned adaptor fastener mounting plate aperture and the extending fastening mounting plate aperture;
wherein the outer surface of the extending member has at least one protrusion, the at least one protrusion oriented substantially parallel with the principal axis of extension in contact with the inward side of the flange.

14. An electrical box extending member having a principal axis of extension, the electrical box extending member comprising:
   a tubular section comprising:
      an inner surface facing an inward direction;
      an outer surface, wherein the outer wall of the extending member has at least one protrusion, the at least one protrusion oriented substantially parallel with the principal axis of extension; and
   a top rim; and
   at least one extender fastener mounting plate, each extender fastener mounting plate fixedly attached to the extending member and adapted to receive a fastener; and
   an electrical device mounting plate extending from the top rim in an inward direction.

15. The electrical box mounting assembly as claimed in claim 1 wherein a first portion of the at least one adaptor fastener mounting plate extends from the edge of adapting plate member in the direction perpendicular to the inner surface of the adapting plate member and a second portion of the at least one adaptor fastener mounting plate extends in a direction of the mud ring aperture substantially parallel to the inner surface of the adapting plate member.

16. The electrical box mounting assembly as claimed in claim 9 wherein a first portion of the at least one adaptor fastener mounting plate extends from the edge of adapting plate member in the direction perpendicular to the inner surface of the adapting plate member and a second portion of the at least one adaptor fastener mounting plate extends in a direction of the mud ring aperture substantially parallel to the inner surface of the adapting plate member.

17. The electrical box mounting assembly as claimed in claim 9 wherein the extending member extends relative to the adapting member in the direction of the principal axis of extension via a rotation of the at least one fastener.

* * * * *